(12) United States Patent
Mizuguchi et al.

(10) Patent No.: US 8,405,906 B2
(45) Date of Patent: Mar. 26, 2013

(54) ZOOM LENS SYSTEM, OPTICAL APPARATUS, AND METHOD FOR MANUFACTURING ZOOM LENS SYSTEM

(75) Inventors: Keiko Mizuguchi, Kawasaki (JP); Tomoki Ito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 550 days.

(21) Appl. No.: 12/211,900

(22) Filed: Sep. 17, 2008

(65) Prior Publication Data
US 2009/0086321 A1 Apr. 2, 2009

(30) Foreign Application Priority Data

Oct. 2, 2007 (JP) ................................. 2007-258973
Dec. 25, 2007 (JP) ................................. 2007-331499

(51) Int. Cl.
*G02B 27/64* (2006.01)
(52) U.S. Cl. ........ 359/557; 359/684; 359/687; 359/695; 359/813
(58) Field of Classification Search .................. 359/554, 359/557, 676, 679, 683, 684, 686, 687, 694–697, 359/747, 813
See application file for complete search history.

(56) References Cited

U.S. PATENT DOCUMENTS

| | | | |
|---|---|---|---|
| 5,477,297 A | 12/1995 | Suzuki | |
| 5,760,957 A | 6/1998 | Suzuki | |
| 5,828,499 A | 10/1998 | Ohtake | |
| 6,010,537 A | 1/2000 | Konno et al. | |
| 6,025,962 A | 2/2000 | Suzuki | |
| 6,101,042 A | 8/2000 | Sato | |
| 6,646,804 B2 | 11/2003 | Harada | |
| 6,693,750 B2 | 2/2004 | Sato | |
| 6,891,680 B2 | 5/2005 | Sato | |
| 7,142,370 B2 | 11/2006 | Sato | |
| 7,190,520 B2* | 3/2007 | Misaka | 359/557 |
| 7,330,316 B2* | 2/2008 | Shibayama et al. | 359/686 |
| 7,336,426 B2* | 2/2008 | Nakatani et al. | 359/683 |
| 7,423,810 B2* | 9/2008 | Bito et al. | 359/557 |
| 2001/0022696 A1 | 9/2001 | Nishio | |
| 2007/0183043 A1* | 8/2007 | Bito et al. | 359/557 |

FOREIGN PATENT DOCUMENTS

| | | |
|---|---|---|
| EP | 0 592 916 A1 | 4/1994 |
| EP | 1632802 A2 | 8/2006 |
| JP | 61-083512 | 4/1986 |

(Continued)

OTHER PUBLICATIONS

Office Action issued May 21, 2012 by the European Patent Office in Application No. 08253029.6.

*Primary Examiner* — Frank G Font
(74) *Attorney, Agent, or Firm* — Miles and Stockbridge P.C.

(57) ABSTRACT

Providing a zoom lens system having a vibration reduction function capable of performing quick focusing with excellent optical performance even upon vibration reduction. The system including, in order from an object, a first lens group G1 having positive refractive power, a second lens group G2 having negative refractive power, a third lens group G3 having positive refractive power, and a fourth lens group G4 having positive refractive power. Upon zooming from a wide-angle end state to a telephoto end state, a distance between the first lens group G1 and the second lens group G2 varies, and a distance between the second lens group G2 and the third lens group G3 varies. The third lens group G3 carries out focusing from an infinity object to a close object. At least a portion of the fourth lens group G4 moves in a direction perpendicular to the optical axis.

48 Claims, 32 Drawing Sheets

FOREIGN PATENT DOCUMENTS

| | | |
|---|---|---|
| JP | 63-210812 | 9/1988 |
| JP | 07-092431 | 4/1995 |
| JP | 11-295597 | 10/1999 |
| JP | 2001/272601 A | 5/2001 |
| JP | 2002-162564 A | 6/2002 |
| JP | 2003-090958 A | 3/2003 |
| JP | 2003-344766 A | 12/2003 |
| JP | 2004-145304 A | 5/2004 |
| JP | 2006-201524 A | 8/2006 |

* cited by examiner

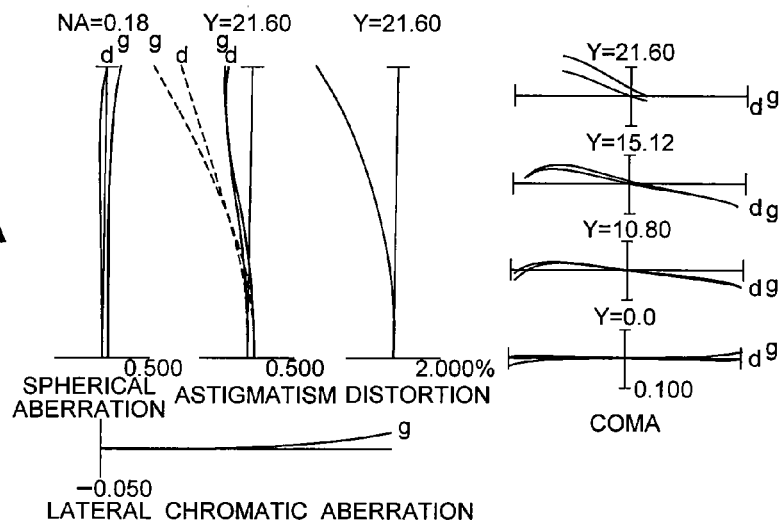
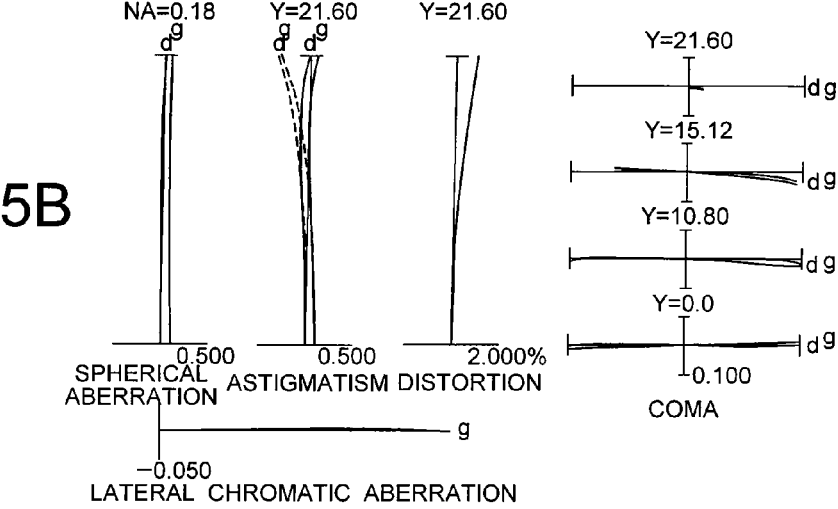

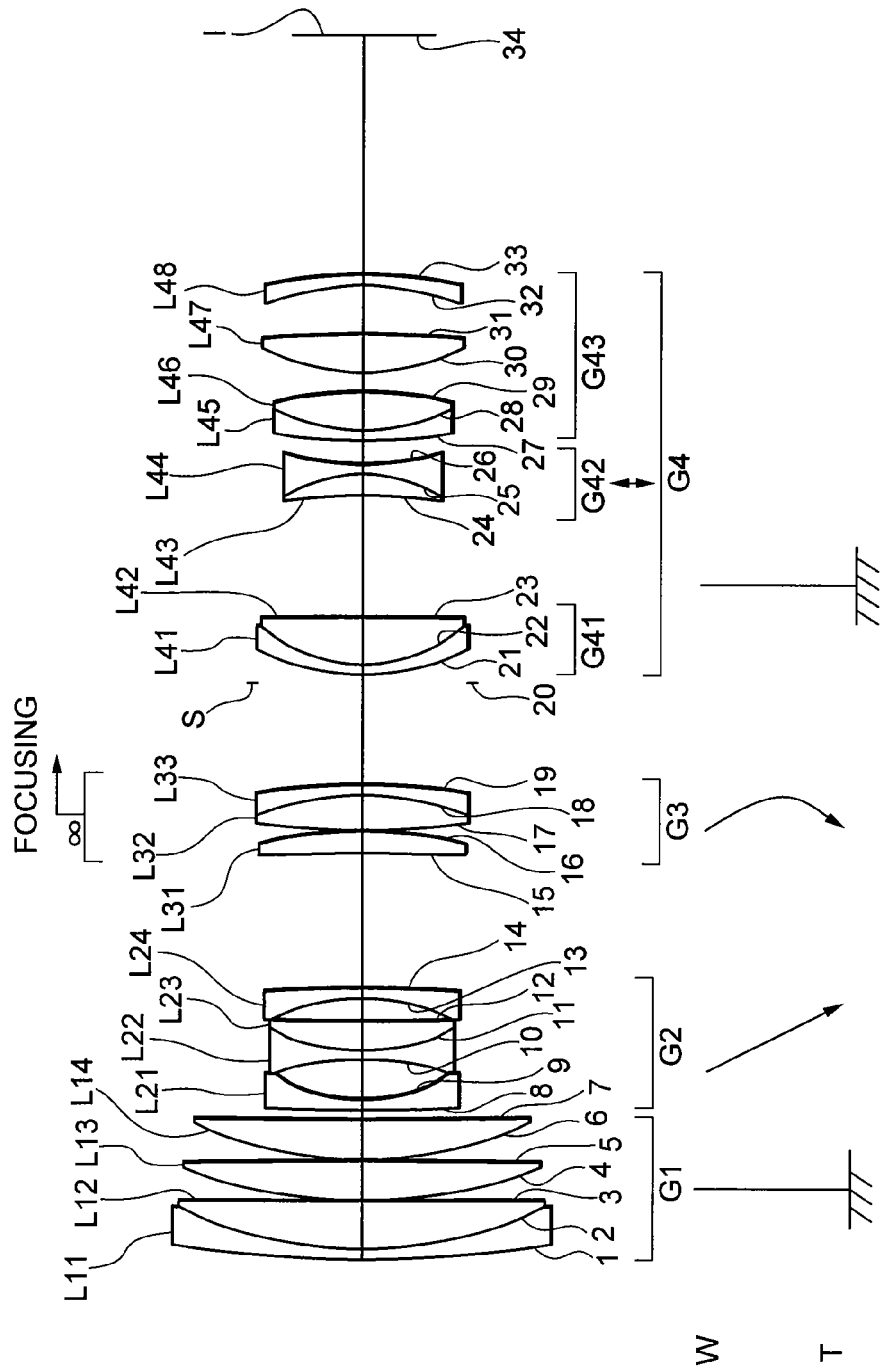

ZOOM LENS SYSTEM, OPTICAL APPARATUS, AND METHOD FOR MANUFACTURING ZOOM LENS SYSTEM

The disclosure of the following priority applications are herein incorporated by reference:
Japanese Patent Application No. 2007-258973 filed on Oct. 2, 2007; and
Japanese Patent Application No. 2007-331499 filed on Dec. 25, 2007.

BACKGROUND OF THE INVENTION

1. Field of the Invention

The present invention relates to a zoom lens system suitable for a single-lens reflex camera using a film or a solid-state imaging device, an optical apparatus using the same, and a method for manufacturing the zoom lens system.

2. Related Background Art

There has been proposed a large aperture zoom lens as a high zoom ratio zoom lens having a vibration reduction function such as Japanese Patent Application Laid-Open Nos. 2003-344766 and 2006-201524.

However, such a conventional zoom lens having a low zoom ratio has a four-lens configuration that is a first lens group having positive refractive power, a second lens group having negative refractive power, a third lens group having positive refractive power, and a fourth lens group having positive refractive power, and focusing is carried out by the fourth lens group with splitting thereof. Accordingly, the focusing lens group becomes large and heavy, so that it has been difficult to focus rapidly.

Moreover, the conventional zoom lens cannot be accomplished excellent optical performance without sufficiently correcting aberrations upon vibration reduction.

SUMMARY OF THE INVENTION

The present invention is made in view of above described problems and has an object to provide a zoom lens system capable of focusing quickly, having excellent optical performance even upon vibration reduction, an optical apparatus using the zoom lens system, and a method for manufacturing the zoom lens system.

According to a first aspect of the present invention, there is provided a zoom lens system comprising, in order from an object: a first lens group having positive refractive power; a second lens group; a third lens group; and an N-th lens group disposed nearer to an image than the third lens group, upon zooming from a wide-angle end state to a telephoto end state, a distance between the first lens group and the second lens group varying, and a distance between the second lens group and the third lens group varying, upon focusing from an infinity object to a close object, the third lens group moving, and at least a portion of the N-th lens group being movable in a direction perpendicular to an optical axis of the zoom lens system.

According to a second aspect of the present invention, there is provided a zoom lens system comprising, in order from an object: a first lens group having positive refractive power; a second lens group; a third lens group; and an N-th lens group disposed nearer to an image than the third lens group; upon zooming from a wide-angle end state to a telephoto end state, the first lens group and the N-th lens group being fixed; the third lens group being movable for focusing from an infinity object to a close object; at least a portion of the N-th lens group being moved in a direction perpendicular to an optical axis of the zoom lens system.

According to a third aspect of the present invention, there is provided a zoom lens system comprising, in order from an object: a first lens group having positive refractive power; a second lens group; a third lens group; and an N-th lens group disposed nearer to an image than the third lens group; upon zooming from a wide-angle end state to a telephoto end state, the first lens group and the N-th lens group being fixed; only one cemented lens in the N-th lens group being movable in a direction perpendicular to an optical axis of the zoom lens system.

According to a fourth aspect of the present invention, there is provided an optical apparatus equipped with the zoom lens system according to the third aspect.

According to a fifth aspect of the present invention, there is provided a method for manufacturing a zoom lens system comprising steps of: disposing, in order from an object, a first lens group having positive refractive power, and a second lens group, a third lens group; disposing an N-th lens group to an image side of the third lens group; varying a distance between the first lens group and the second lens group, and a distance between the second lens group and the third lens group upon zooming from a wide-angle end state to a telephoto end state; moving the third lens group along an optical axis of the zoom lens system upon focusing from an infinity object to a close object; and moving at least a portion of the N-th lens group in a direction perpendicular to the optical axis upon vibration reduction.

According to a sixth aspect of the present invention, there is provided a method for manufacturing a zoom lens system comprising steps of: disposing, in order from an object, a first lens group having positive refractive power, a second lens group, and a third lens group; disposing an N-th lens group to an image side of the third lens group; fixing positions of the first lens group and the N-th lens group upon zooming from a wide-angle end state to a telephoto end state; moving the third lens group along an optical axis of the zoom lens system upon focusing from an infinity object to a close object; and moving at least a portion of the N-th lens group in a direction perpendicular to the optical axis upon vibration reduction.

According to a seventh aspect of the present invention, there is provided a method for manufacturing a zoom lens system comprising steps of: disposing, in order from an object, a first lens group having positive refractive power, a second lens group, and a third lens group; disposing an N-th lens group to an image side of the third lens group; fixing positions of the first lens group and the N-th lens group along an optical axis of the zoom lens system upon zooming from a wide-angle end state to a telephoto end state; and moving only one cemented lens in the N-th lens group in a direction perpendicular to the optical axis upon vibration reduction.

The present invention makes it possible to provide a zoom lens system having a vibration reduction function capable of performing quick focusing with excellent optical performance even upon vibration reduction, an optical apparatus equipped therewith, and a method for manufacturing the zoom lens system.

BRIEF DESCRIPTION OF THE DRAWINGS

FIGS. 2A, and 2B are graphs showing various aberrations of the zoom lens system according to Example 1 in a wide-angle end state, in which FIG. 2A shows various aberrations upon focusing on infinity, FIG. 2B shows coma upon focusing on infinity upon correcting a rotational camera shake of 0.30 degrees.

FIGS. 4A, and 4B are graphs showing various aberrations of the zoom lens system according to Example 1 in a telephoto end state, in which FIG. 4A shows various aberrations upon focusing on infinity, and FIG. 4B shows coma upon focusing on infinity upon correcting a rotational camera shake of 0.15 degrees.

FIGS. 5A, 5B and 5C are graphs showing various aberrations of the zoom lens system according to Example 1 upon focusing on a close object, in which FIG. 5A is in the wide-angle end state, FIG. 5B is in the intermediate focal length state, and FIG. 5C is in the telephoto end state.

FIGS. 7A, and 7B are graphs showing various aberrations of the zoom lens system according to Example 2 in a wide-angle end state, in which FIG. 7A shows various aberrations upon focusing on infinity, FIG. 7B shows coma upon focusing on infinity upon correcting a rotational camera shake of 0.30 degrees.

FIGS. 9A, and 9B are graphs showing various aberrations of the zoom lens system according to Example 2 in a telephoto end state, in which FIG. 9A shows various aberrations upon focusing on infinity, and FIG. 9B shows coma upon focusing on infinity upon correcting a rotational camera shake of 0.15 degrees.

FIGS. 10A, 10B and 10C are graphs showing various aberrations of the zoom lens system according to Example 2 upon focusing on a close object, in which FIG. 10A is in the wide-angle end state, FIG. 10B is in the intermediate focal length state, and FIG. 10C is in the telephoto end state.

FIGS. 12A and 12B are graphs showing various aberrations of the zoom lens system according to Example 3 in a wide-angle end state, in which FIG. 12A shows various aberrations upon focusing on infinity, FIG. 12B shows coma upon focusing on infinity upon correcting a rotational camera shake of 0.30 degrees.

FIGS. 14A and 14B are graphs showing various aberrations of the zoom lens system according to Example 3 in a telephoto end state, in which FIG. 14A shows various aberrations upon focusing on infinity, and FIG. 14B shows coma upon focusing on infinity upon correcting a rotational camera shake of 0.15 degrees.

FIGS. 15A, 15B and 15C are graphs showing various aberrations of the zoom lens system according to Example 3 upon focusing on a close object, in which FIG. 15A is in the wide-angle end state, FIG. 15B is in the intermediate focal length state, and FIG. 15C is in the telephoto end state.

FIGS. 17A, and 17B are graphs showing various aberrations of the zoom lens system according to Example 4 in a wide-angle end state, in which FIG. 17A shows various aberrations upon focusing on infinity, FIG. 17B shows coma upon focusing on infinity upon correcting a rotational camera shake of 0.40 degrees.

FIGS. 19A, and 19B are graphs showing various aberrations of the zoom lens system according to Example 4 in a telephoto end state, in which FIG. 19A shows various aberrations upon focusing on infinity, and FIG. 19B shows coma upon focusing on infinity upon correcting a rotational camera shake of 0.20 degrees.

FIGS. 20A, 20B and 20C are graphs showing various aberrations of the zoom lens system according to Example 4 upon focusing on a close object, in which FIG. 20A is in the wide-angle end state, FIG. 20B is in the intermediate focal length state, and FIG. 20C is in the telephoto end state.

FIGS. 22A, and 22B are graphs showing various aberrations of the zoom lens system according to Example 5 in a wide-angle end state, in which FIG. 22A shows various aberrations upon focusing on infinity, FIG. 22B shows coma upon focusing on infinity upon correcting a rotational camera shake of 0.40 degrees.

FIGS. 24A, and 24B are graphs showing various aberrations of the zoom lens system according to Example 5 in a telephoto end state, in which FIG. 24A shows various aberrations upon focusing on infinity, and FIG. 24B shows coma upon focusing on infinity upon correcting a rotational camera shake of 0.20 degrees.

FIGS. 25A, 25B and 25C are graphs showing various aberrations of the zoom lens system according to Example 5 upon focusing on a close object, in which FIG. 25A is in the wide-angle end state, FIG. 25B is in the intermediate focal length state, and FIG. 25C is in the telephoto end state.

FIG. 26 is a sectional view showing a lens configuration of a zoom lens system having a vibration reduction function according to Example 6 of the second embodiment.

FIGS. 27A, and 27B are graphs showing various aberrations of the zoom lens system according to Example 6 in a wide-angle end state, in which FIG. 27A shows various aberrations upon focusing on infinity, FIG. 27B shows coma upon focusing on infinity upon correcting a rotational camera shake of 0.40 degrees.

FIGS. 29A, and 29B are graphs showing various aberrations of the zoom lens system according to Example 6 in a telephoto end state, in which FIG. 29A shows various aberrations upon focusing on infinity, and FIG. 29B shows coma upon focusing on infinity upon correcting a rotational camera shake of 0.20 degrees.

FIGS. 30A, 30B and 30C are graphs showing various aberrations of the zoom lens system according to Example 6 upon focusing on a close object, in which FIG. 30A is in the wide-angle end state, FIG. 30B is in the intermediate focal length state, and FIG. 30C is in the telephoto end state.

DESCRIPTION OF THE MOST PREFERRED EMBODIMENT

First Embodiment

Figure 1:
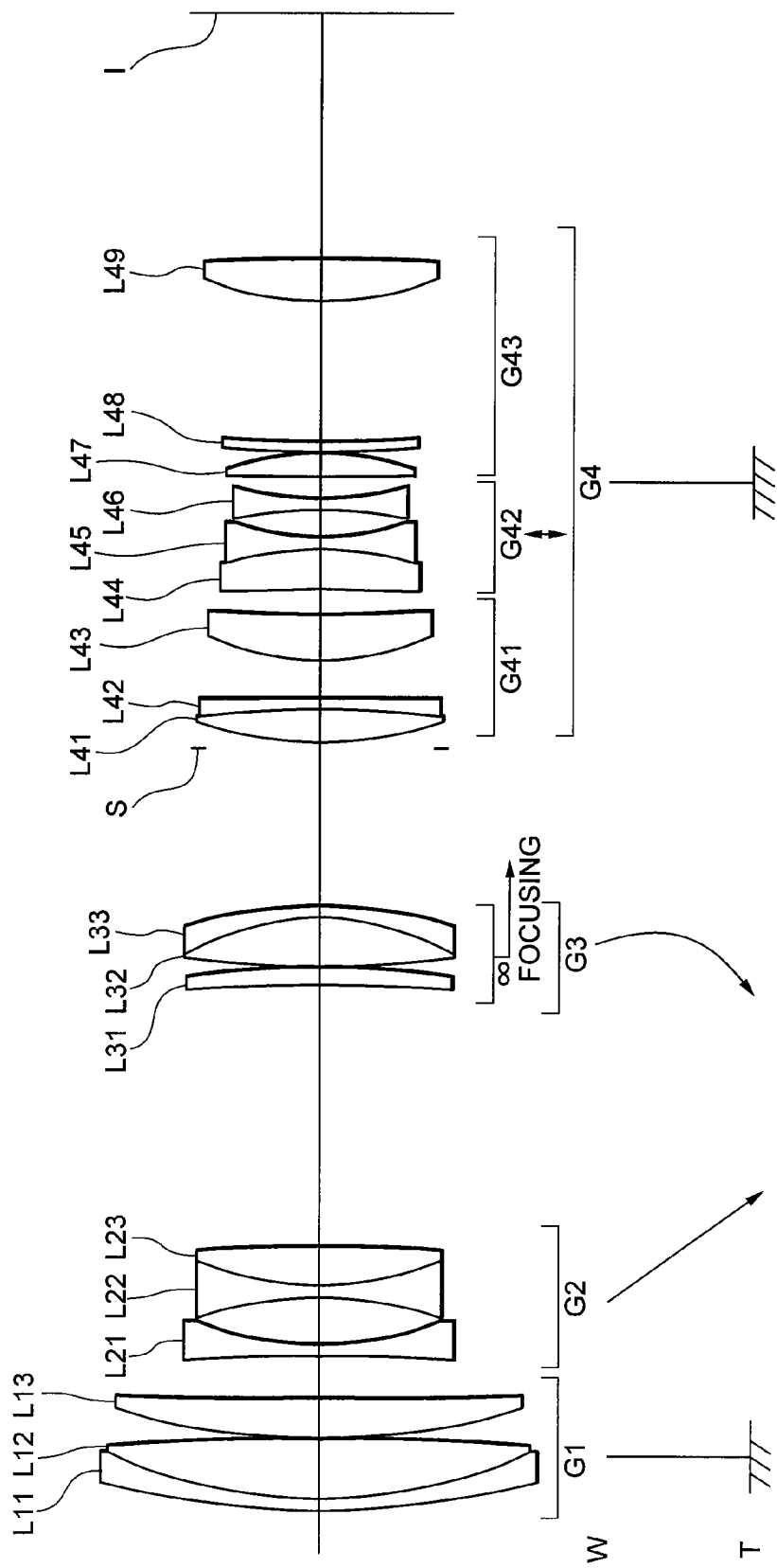
FIG. 1 is a sectional view showing a lens configuration of a zoom lens system having a vibration reduction function according to Example 1 of a first embodiment.

A zoom lens system having a vibration reduction function according to a first embodiment is explained below.

A zoom lens system according to the first embodiment includes, in order from an object, a first lens group having positive refractive power, a second lens group having negative refractive power, a third lens group having positive refractive power, and a fourth lens group having positive refractive power. Upon zooming from a wide-angle end state to a telephoto end state, the second lens group and the third lens group are moved. With this configuration, it becomes advantageous to make the zoom mechanism simple.

Upon focusing from an infinity object to a close object, the third lens group is moved along the optical axis. With focusing by the third lens group, which is small and compact, it becomes possible to carry out quick focusing.

In the fourth lens group, at least a portion of the lens group is moved as a vibration reductioN-th lens group in a direction perpendicular to the optical axis for correcting an image blur caused by a camera shake. With this configuration, it becomes possible to make the diameter of the vibration reductioN-th lens group smaller than that of the first lens group through that of the third lens group, and the vibration reduction mechanism can be compact, so that it becomes advantageous to make the whole zoom lens system compact.

Moreover, with adopting such configuration, deterioration in optical performance upon moving the vibration reductioN-th lens in a direction perpendicular to the optical axis can be small.

The fourth lens group is composed of, in order from the object, a front lens group having positive refractive power, a middle lens group having negative refractive power, and a rear lens group. It is preferable that correction of the image blur caused by a camera shake is carried out by moving only the middle lens group in a direction perpendicular to the optical axis. With making the front lens group positive and the middle lens group negative, the effective diameter of the middle lens group can be made smaller than the effective diameters of the first lens group through the rear lens group, and the vibration reduction mechanism can be compact, so that it becomes advantageous to make the whole zoom lens system compact.

Moreover, with adopting such configuration, deterioration in optical performance upon moving the middle lens group in a direction perpendicular to the optical axis can be small.

In a zoom lens system having a vibration reduction mechanism according to the first embodiment, it is preferable that upon zooming from the wide-angle end state to the telephoto end state, a distance between the first lens group and the second lens group increases, and a distance between the second lens group and the third lens group decreases. With this configuration, it becomes advantageous to make the zooming mechanism simple.

In a zoom lens system having a vibration reduction mechanism according to the first embodiment, it is preferable that upon zooming from the wide-angle end state to the telephoto end state, the first lens group is fixed. With this configuration, it becomes advantageous to make the zooming mechanism simple.

In a zoom lens system having a vibration reduction mechanism according to the first embodiment, it is preferable that upon zooming from the wide-angle end state to the telephoto end state, the fourth lens group is fixed. With this configuration, it becomes advantageous to make the zooming mechanism simple.

In a zoom lens system having a vibration reduction mechanism according to the first embodiment, the following conditional expression (1) is preferably satisfied:

$$-0.90 < f2/fw < -0.50 \tag{1}$$

where f2 denotes a focal length of the second lens group, and fw denotes a focal length of the zoom lens system in the wide-angle end state.

Conditional expression (1) defines an appropriate range of the focal length of the second lens group. In the following explanations, "refractive power is strong, or weak" means that "the absolute value of refractive power is strong, or weak".

When the ratio f2/fw is equal to or exceeds the upper limit of conditional expression (1), negative refractive power of the second lens group becomes strong, so that it becomes difficult to correct spherical aberration and coma.

On the other hand, when the ratio f2/fw is equal to or falls below the lower limit of conditional expression (1), negative refractive power of the second lens group becomes weak, so that it becomes difficult to obtain the zoom ratio of about three. Moreover, it becomes difficult to correct astigmatism and curvature of field.

In order to secure the effect of the first embodiment, it is preferable to set the lower limit of conditional expression (1) to −0.80. In order to secure the effect of the first embodiment, it is preferable to set the upper limit of conditional expression (1) to −0.53.

In a zoom lens system having a vibration reduction mechanism according to the first embodiment, the following conditional expression (2) is preferably satisfied:

$$1.39 < f1/fw < 2.00 \tag{2}$$

where f1 denotes a focal length of the first lens group.

Conditional expression (2) defines an appropriate range of the focal length of the first lens group.

When the ratio f1/fw is equal to or exceeds the upper limit of conditional expression (2), refractive power of the first lens group becomes weak, so that the total lens length of the zoom lens system becomes large. Moreover, it becomes difficult to correct astigmatism.

On the other hand, when the ratio f1/fw is equal to or falls below the lower limit of conditional expression (2), refractive power of the first lens group becomes strong, so that it becomes difficult to correct spherical aberration and longitudinal chromatic aberration.

In order to secure the effect of the first embodiment, it is preferable to set the lower limit of conditional expression (2) to 1.50. In order to secure the effect of the first embodiment, it is preferable to set the upper limit of conditional expression (2) to 1.90.

In a zoom lens system having a vibration reduction mechanism according to the first embodiment, the following conditional expression (3) is preferably satisfied:

$$1.60 < f4/fw < 2.00 \tag{3}$$

where f4 denotes a focal length of the fourth lens group.

Conditional expression (3) defines an appropriate range of the fourth lens group.

When the ratio f4/fw is equal to or exceeds the upper limit of conditional expression (3), refractive power of the fourth lens group becomes weak, so that the total lens length becomes large. Moreover, it becomes difficult to correct spherical aberration.

On the other hand, when the ratio f4/fw is equal to or falls below the lower limit of conditional expression (3), refractive power of the fourth lens group becomes strong, so that it becomes difficult to correct various aberrations such as spherical aberration.

In order to secure the effect of the first embodiment, it is preferable to set the lower limit of conditional expression (3) to 1.65. In order to secure the effect of the first embodiment, it is preferable to set the upper limit of conditional expression (3) to 1.90.

In a zoom lens system having a vibration reduction mechanism according to the first embodiment, the following conditional expression (4) is preferably satisfied:

$$-0.40 < f42/f4 < -0.10 \quad (4)$$

where f42 denotes a focal length of the middle lens group in the fourth lens group.

Conditional expression (4) defines an appropriate range of the middle lens group in the fourth lens group.

When the ratio f42/f4 is equal to or exceeds the upper limit of conditional expression (4), negative refractive power of the middle lens group becomes strong, since the ratio of the moving amount of the image on the image plane to the moving amount of the middle lens group upon correcting an image blur becomes large, allowance of driving error of the middle lens group for correcting an image blur becomes small, so that it becomes difficult to control a driving amount of the middle lens group. Moreover, it becomes difficult to correct spherical aberration and astigmatism.

On the other hand, when the ratio f42/f4 is equal to or falls below the lower limit of conditional expression (4), negative refractive power of the middle lens group becomes weak, since the ratio of the moving amount of the image on the image plane to the moving amount of the middle lens group upon correcting an image blur becomes small, a moving amount of the middle lens group upon correcting an image blur becomes large, so that the vibration reduction mechanism becomes large. Moreover, it becomes difficult to correct astigmatism, coma and distortion.

In order to secure the effect of the first embodiment, it is preferable to set the lower limit of conditional expression (4) to −0.30. In order to secure the effect of the first embodiment, it is preferable to set the upper limit of conditional expression (4) to −0.10.

In a zoom lens system having a vibration reduction mechanism according to the first embodiment, the following conditional expressions (5) and (6) are preferably satisfied:

$$0.20 < f41/f4 < 0.80 \quad (5)$$

$$0.20 < f43/f4 < 0.50 \quad (6)$$

where f41 denotes a focal length of the front lens group in the fourth lens group, and f43 denotes a focal length of the rear lens group in the fourth lens group.

Conditional expression (5) defines an appropriate range of the front lens group in the fourth lens group.

When the ratio f41/f4 is equal to or falls below the lower limit of conditional expression (5), positive refractive power of the front lens group becomes strong, so that it becomes difficult to correct spherical aberration and coma.

On the other hand, when the ratio f41/f4 is equal to or exceeds the upper limit of conditional expression (5), positive refractive power of the front lens group becomes weak, so that the total lens length of the zoom lens system becomes large. Moreover, it becomes difficult to correct spherical aberration and coma.

In order to secure the effect of the first embodiment, it is preferable to set the upper limit of conditional expression (5) to 0.60. In order to secure the effect of the first embodiment, it is preferable to set the lower limit of conditional expression (5) to 0.30.

Conditional expression (6) defines an appropriate range of the rear lens group in the fourth lens group.

When the ratio f43/f4 is equal to or exceeds the upper limit of conditional expression (6), positive refractive power of the rear lens group becomes weak, so that the total lens length of the zoom lens system becomes large. Moreover, it becomes difficult to correct astigmatism and coma.

On the other hand, when the ratio f43/f4 is equal to or falls below the lower limit of conditional expression (6), positive refractive power of the rear lens group becomes strong, so that it becomes difficult to correct coma and distortion.

In order to secure the effect of the first embodiment, it is preferable to set the lower limit of conditional expression (6) to 0.30. In order to secure the effect of the first embodiment, it is preferable to set the upper limit of conditional expression (6) to 0.45.

A zoom lens system having a vibration reduction mechanism according to the first embodiment has an aperture stop, and the aperture stop is disposed to the image side of the third lens group. With this configuration, it becomes possible to excellently correct spherical aberration.

Each example of a zoom lens system having a vibration reduction mechanism according to the first embodiment is explained below with reference to accompanying drawings.

Example 1

FIG. 1 is a sectional view showing a lens configuration of a zoom lens system having a vibration reduction function according to Example 1 of a first embodiment.

In FIG. 1, the zoom lens system having a vibration reduction function is composed of, in order from an object, a first lens group G1 having positive refractive power, a second lens group G2 having negative refractive power, a third lens group G3 having positive refractive power, and a fourth lens group G4 having positive refractive power. Upon zooming from a wide-angle end state (W) to a telephoto end state (T), the second lens group G2 moves to the image plane I side, the third lens group G3 moves at first to the image plane I side and then to the object side, and the first lens group G1 and the fourth lens group G4 are fixed such that a distance between the first lens group G1 and the second lens group G2 increases, and a distance between the second lens group G2 and the third lens group G3 decreases.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a double concave negative lens L21, and a cemented lens constructed by a double concave negative lens L22 cemented with a double convex positive lens L23.

The third lens group G3 is composed of, in order from the object, a positive meniscus lens L31 having a concave surface facing the object, and a cemented lens constructed by a double convex positive lens L32 cemented with a negative meniscus lens L33 having a concave surface facing the object.

The fourth lens group G4 is composed of, in order from the object, a front lens group G41 having positive refractive power, a middle lens group G42 having negative refractive power, and a rear lens group G43 having positive refractive power.

The front lens group G41 is composed of, in order from the object, a cemented lens constructed by a double convex positive lens L41 cemented with a double concave negative lens L42, and a positive meniscus lens L43 having a convex surface facing the object.

The middle lens group G42 is composed of, in order from the object, a cemented lens constructed by a positive meniscus lens L44 having a convex surface facing the image plane I cemented with a double concave negative lens L45, and a double concave negative lens L46.

The rear lens group G43 is composed of, in order from the object, a double convex positive lens L47, a positive meniscus lens L48 having a convex surface facing the object, and a double convex positive lens L49.

An aperture stop S is disposed to the image plane I side of the third lens group G3, and is fixed together with the fourth lens group G4 upon zooming from the wide-angle end state (W) to the telephoto end state (T).

An image blur on the image plane I caused by a camera shake is corrected by moving the middle lens group G42 in the direction perpendicular to the optical axis.

Focusing from an infinity object to a close object is carried out by moving the third lens group G3 to the image plane I side.

In a zoom lens system having a focal length of f, a vibration reduction coefficient, which is a ratio of a moving amount of an image on the image plane to that of the moving lens group perpendicularly to the optical axis upon correcting a camera shake, of K, in order to correct rotational camera shake of an angle of $\theta$, the moving lens group for correcting the camera shake may be moved by the amount of $(f \cdot \tan \theta)/K$ perpendicularly to the optical axis. The relation is the same in the other examples explained later, so the duplicated explanations are to be omitted.

In the wide-angle end state (W) in Example 1, the vibration reduction coefficient K is 2.52, and the focal length is 71.40 (mm), so that the moving amount of the middle lens group G42 for correcting a rotational camera shake of 0.30 degrees is 0.148 (mm). In the telephoto end state (T), the vibration reduction coefficient K is 2.52, and the focal length is 196.00 (mm), so that the moving amount of the middle lens group G42 for correcting a rotational camera shake of 0.15 degrees is 0.204 (mm).

Various values associated with the zoom lens system having a vibration reduction function according to Example 1 of the first embodiment are listed in Table 1.

In [Specifications], W denotes a wide-angle end state, M denotes an intermediate focal length state, T denotes a telephoto end state, f denotes a focal length of the zoom lens system, FNO denotes an f-number, 2ω denotes an angle of view, and Y denotes an image height, TL denotes a total lens length, and Bf denotes a back focal length.

In [Lens Data], the left most column "I" shows the lens surface number counted in order from the object side, the second column "r" shows a radius of curvature of the lens surface, the third column "d" shows a distance to the next surface, the fourth column "nd" shows refractive index of the material at d-line (wavelength λ=587.6 nm), and the fifth column "vd" shows Abbe number of the material at d-line (wavelength λ=587.6 nm). In the fifth column "nd" refractive index of the air nd=1.000000 is omitted. In the second column "r", r=∞ denotes a plane surface. In the third column "d", Bf denotes back focal length.

In [Variable Distances], dI denotes a variable distance at the surface number I, β denotes a photographing magnification, d0 denotes a distance between the most object side lens surface and the object.

In [Moving Amount for Focusing], δ3 denotes a moving amount of the third lens group upon focusing from an infinity object to a close object locating at photographing distance of 1500 mm.

In [Lens Group Data], a starting surface number "I" and a focal length of each lens group are shown.

In [Values for Conditional Expressions], values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Specifications]
Zoom Ratio: 2.7451

| | W | M | T |
|---|---|---|---|
| f = | 71.40 | 135.00 | 196.00 |
| FNO = | 2.83 | 2.83 | 2.83 |
| 2ω = | 34.69 | 17.82 | 12.21 |
| Y = | 21.60 | 21.60 | 21.60 |
| TL = | 259.58 | 259.58 | 259.58 |
| Bf = | 42.00 | 42.00 | 42.00 |

[Lens Data]

| I | r | d | nd | vd |
|---|---|---|---|---|
| 1 | 135.3046 | 2.20 | 1.84666 | 23.78 |
| 2 | 84.6206 | 10.00 | 1.58913 | 61.16 |
| 3 | −768.6706 | 0.20 | | |
| 4 | 112.2198 | 7.00 | 1.51860 | 69.98 |
| 5 | 760.7104 | (d5) | | |
| 6 | −797.8831 | 2.00 | 1.81600 | 46.62 |
| 7 | 56.9896 | 8.07 | | |
| 8 | −63.7893 | 2.00 | 1.74320 | 49.31 |
| 9 | 53.4139 | 6.51 | 1.84666 | 23.78 |
| 10 | −576.4232 | (d10) | | |
| 11 | −394.3750 | 3.00 | 1.84666 | 23.78 |
| 12 | −207.4593 | 0.10 | | |
| 13 | 145.4412 | 8.71 | 1.49782 | 82.52 |
| 14 | −46.1432 | 2.00 | 1.71736 | 29.52 |
| 15 | −82.4451 | (d15) | | |
| 16 | ∞ | 1.00 | Aperture Stop S | |
| 17 | 61.2996 | 5.88 | 1.62299 | 58.22 |
| 18 | −189.9183 | 2.00 | 1.69895 | 30.13 |
| 19 | 6085.4791 | 6.65 | | |
| 20 | 44.1247 | 7.96 | 1.49782 | 82.52 |
| 21 | 240.1185 | 4.50 | | |
| 22 | −393.4342 | 7.00 | 1.84666 | 23.78 |
| 23 | −55.6644 | 2.00 | 1.62280 | 57.03 |
| 24 | 39.7431 | 4.72 | | |
| 25 | −83.3602 | 2.00 | 1.84666 | 23.78 |
| 26 | 48.9943 | 3.82 | | |
| 27 | 427.3471 | 4.12 | 1.61293 | 36.96 |
| 28 | −51.6607 | 0.10 | | |
| 29 | 146.5531 | 2.00 | 1.49782 | 82.52 |
| 30 | 218.9414 | 24.35 | | |
| 31 | 53.4574 | 7.33 | 1.49782 | 82.52 |
| 32 | −500.0000 | (Bf) | | |

TABLE 1-continued

[Variable Distances]

| | W | M | T |
|---|---|---|---|
| (Focusing on Infinity) | | | |
| d5 | 7.11 | 39.46 | 50.00 |
| d10 | 45.43 | 22.80 | 2.00 |
| d15 | 27.71 | 18.00 | 28.26 |
| Bf | 42.00 | 42.00 | 42.00 |
| (Focusing on a Close Object) | | | |
| β | −0.052 | −0.084 | −0.106 |
| d0 | 1234 | 1234 | 1234 |
| d5 | 7.11 | 39.46 | 50.00 |
| d10 | 50.00 | 37.29 | 28.26 |
| d15 | 23.14 | 3.50 | 2.00 |
| Bf | 42.00 | 42.00 | 42.00 |

[Moving Amount for Focusing]

| | W | M | T |
|---|---|---|---|
| f | 71.40 | 135.00 | 196.00 |
| δ3 | 4.5673 | 24.2063 | 25.7091 |

[Lens Group Data]

| Group | I | focal length |
|---|---|---|
| G1 | 1 | 127.627 |
| G2 | 6 | −41.006 |
| G3 | 11 | 108.605 |
| G4 | 17 | 124.031 |
| G41 | 17 | 55.378 |
| G42 | 22 | −22.876 |
| G43 | 27 | 48.234 |

[Values for Conditional Expressions]

(1): f2/fw = −0.574
(2): f1/fw = 1.788
(3): f4/fw = 1.738
(4): f42/f4 = −0.184
(5): f41/f4 = 0.446
(6): f43/f4 = 0.389

Figure 2A:
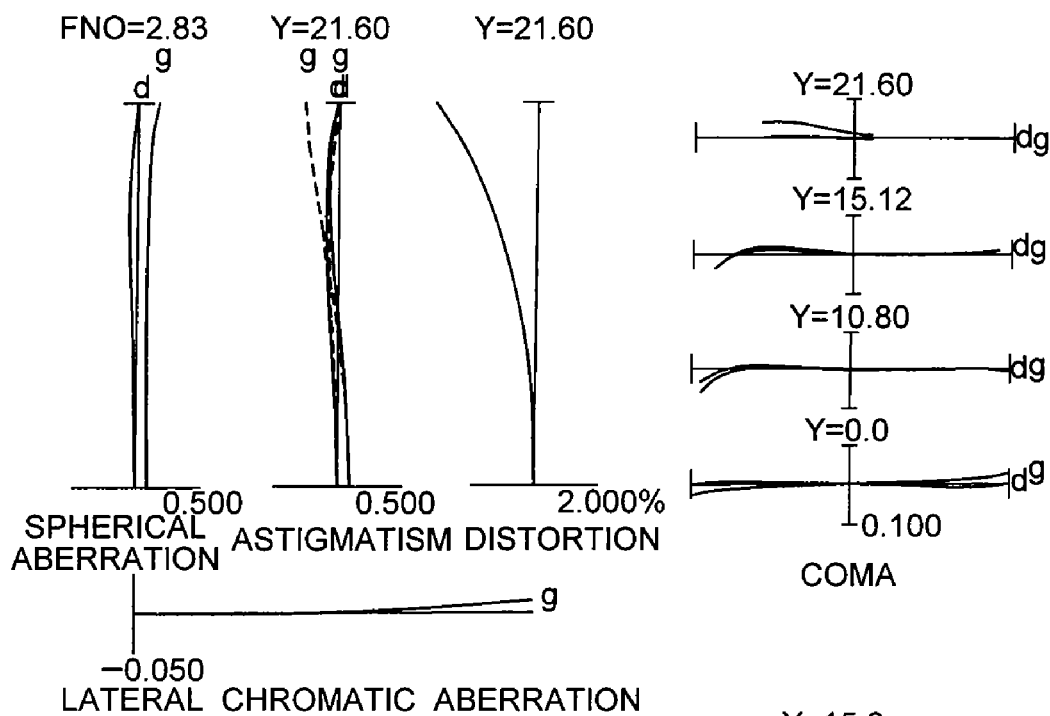
Figure 2B:
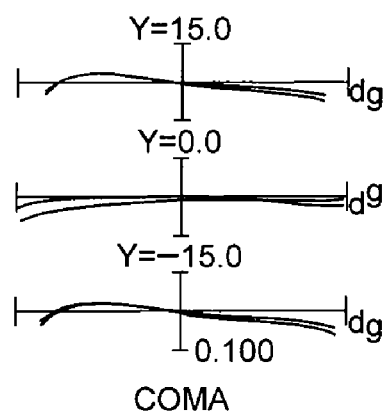
Figure 3:
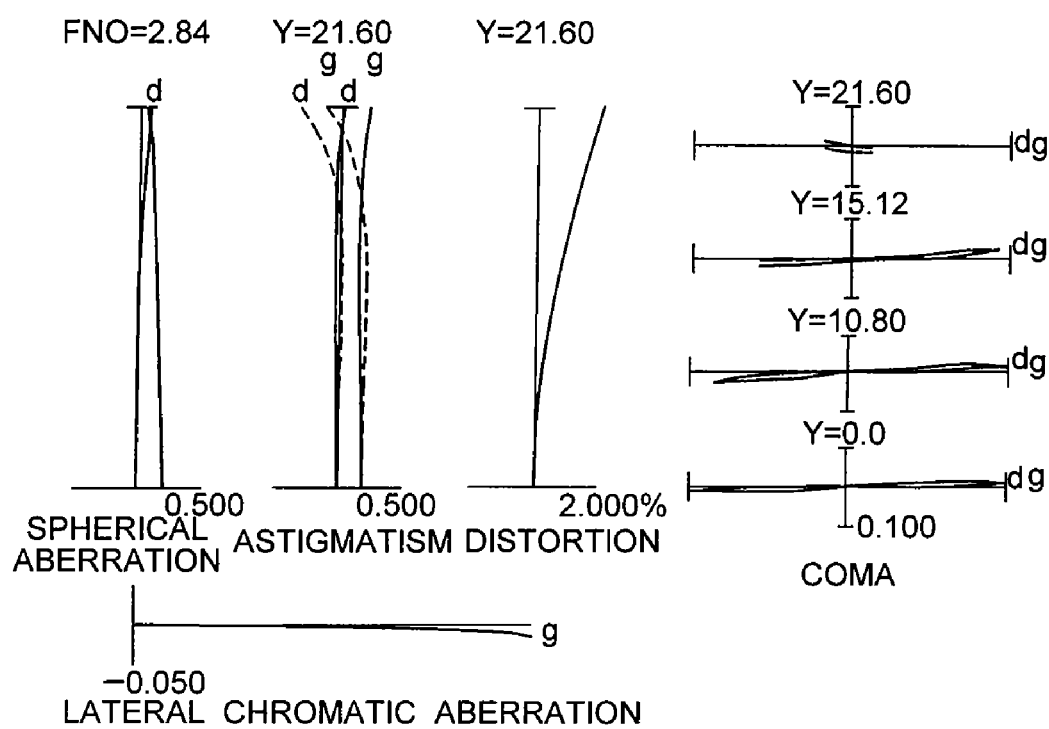
FIG. 3 shows various aberrations of the zoom lens system according to Example 1 in an intermediate focal length state upon focusing on infinity.
Figure 4A:
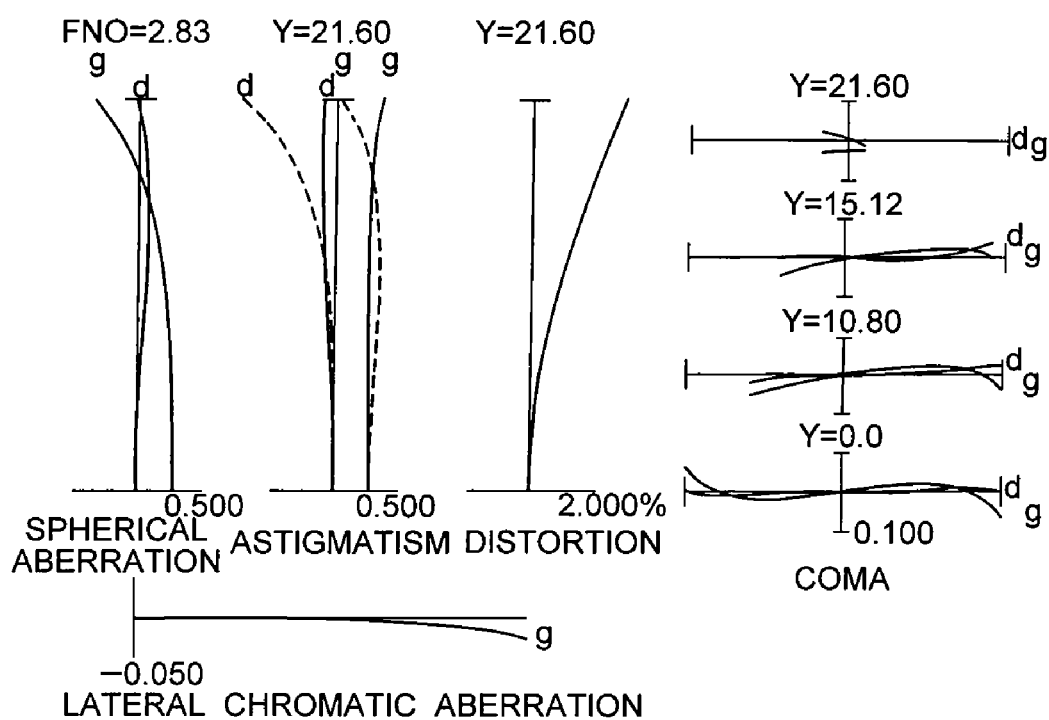
Figure 4B:
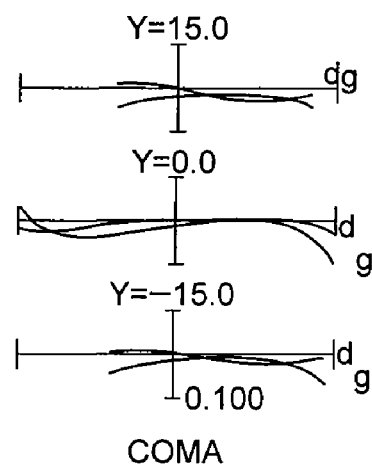

FIGS. 2A, and 2B are graphs showing various aberrations of the zoom lens system according to Example 1 in a wide-angle end state, in which FIG. 2A shows various aberrations upon focusing on infinity, FIG. 2B shows coma upon focusing on infinity upon correcting a rotational camera shake of 0.30 degrees. FIG. 3 shows various aberrations of the zoom lens system according to Example 1 in an intermediate focal length state upon focusing on infinity. FIGS. 4A, and 4B are graphs showing various aberrations of the zoom lens system according to Example 1 in a telephoto end state, in which FIG. 4A shows various aberrations upon focusing on infinity, and FIG. 4B shows coma upon focusing on infinity upon correcting a rotational camera shake of 0.15 degrees. FIGS. 5A, 5B and 5C are graphs showing various aberrations of the zoom lens system according to Example 1 upon focusing on a close object, in which FIG. 5A is in the wide-angle end state, FIG. 5B is in the intermediate focal length state, and FIG. 5C is in the telephoto end state.

In respective graphs, FNO denotes an f-number, NA denotes a numerical aperture, Y denotes an image height. In respective graphs, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane. The above-described explanation regarding various aberration graphs is the same as the other Examples.

As is apparent from the respective graphs, the zoom lens system having a vibration reduction function according to Example 1 of the first embodiment shows superb optical performance as a result of good corrections to various aberrations in the wide-angle end state, in the intermediate focal length state, and in the telephoto end state.

Example 2

Figure 6:
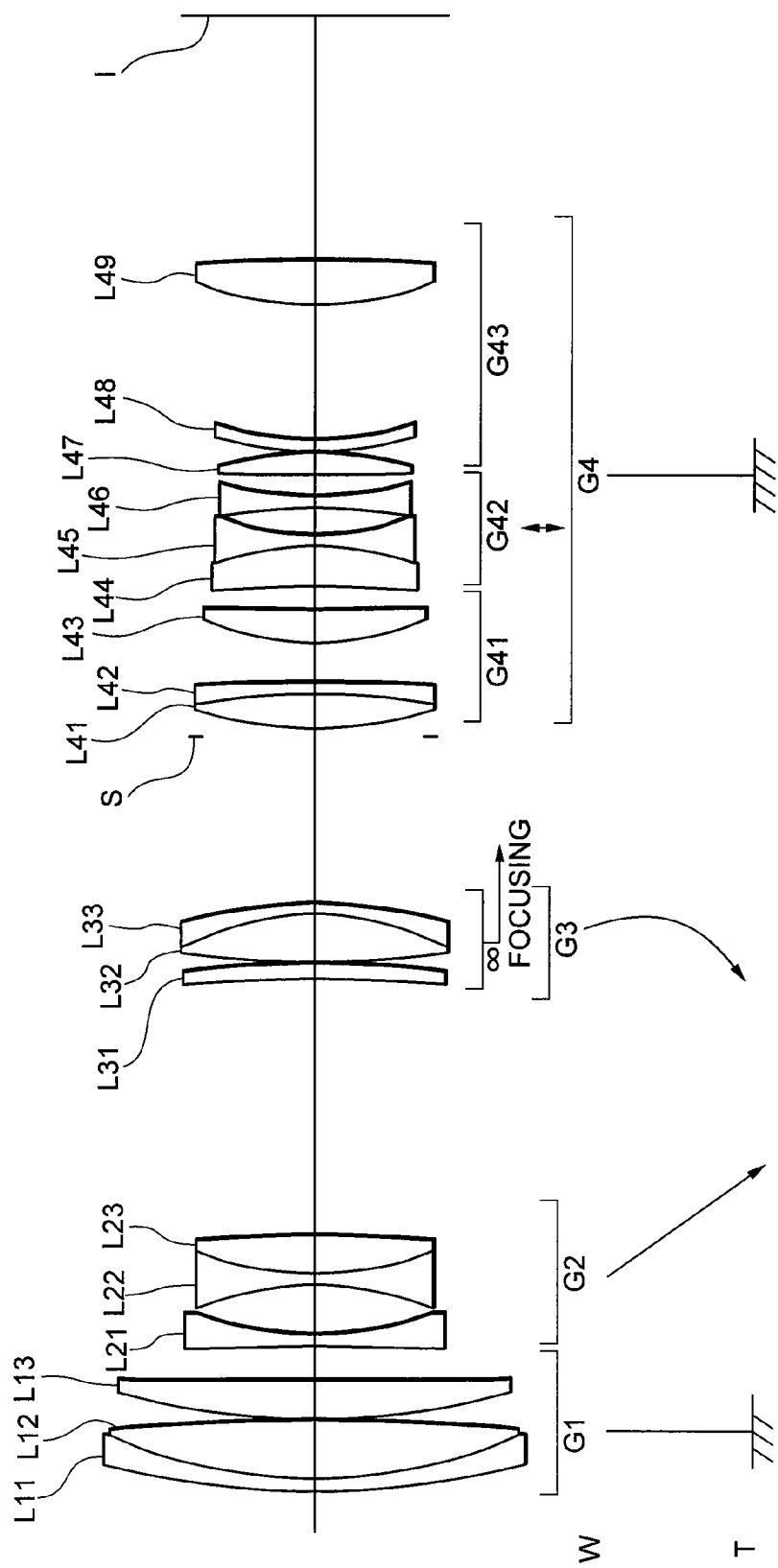
FIG. 6 is a sectional view showing a lens configuration of a zoom lens system having a vibration reduction function according to Example 2 of the first embodiment.

FIG. 6 is a sectional view showing a lens configuration of a zoom lens system having a vibration reduction function according to Example 2 of the first embodiment.

In FIG. 6, the zoom lens system having a vibration reduction function is composed of, in order from an object, a first lens group G1 having positive refractive power, a second lens group G2 having negative refractive power, a third lens group G3 having positive refractive power, and a fourth lens group G4 having positive refractive power. Upon zooming from a wide-angle end state (W) to a telephoto end state (T), the second lens group G2 moves to the image plane I side, the third lens group G3 moves at first to the image plane I side and then to the object side, and the first lens group G1 and the fourth lens group G4 are fixed such that a distance between the first lens group G1 and the second lens group G2 increases, and a distance between the second lens group G2 and the third lens group G3 decreases.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a double concave negative lens L21, and a cemented lens constructed by a double concave negative lens L22 cemented with a double convex positive lens L23.

The third lens group G3 is composed of, in order from the object, a positive meniscus lens L31 having a concave surface facing the object, and a cemented lens constructed by a double convex positive lens L32 cemented with a negative meniscus lens L33 having a concave surface facing the object.

The fourth lens group G4 is composed of, in order from the object, a front lens group G41 having positive refractive power, a middle lens group G42 having negative refractive power, and a rear lens group G43 having positive refractive power.

The front lens group G41 is composed of, in order from the object, a cemented lens constructed by a double convex positive lens L41 cemented with a double concave negative lens L42, and a positive meniscus lens L43 having a convex surface facing the object.

The middle lens group G42 is composed of, in order from the object, a cemented lens constructed by a positive meniscus lens L44 having a convex surface facing the image plane I cemented with a double concave negative lens L45, and a double concave negative lens L46.

The rear lens group G43 is composed of, in order from the object, a double convex positive lens L47, a positive meniscus lens L48 having a convex surface facing the object, and a double convex positive lens L49.

An aperture stop S is disposed to the image plane I side of the third lens group G3, and is fixed together with the fourth lens group G4 upon zooming from the wide-angle end state (W) to the telephoto end state (T).

An image blur on the image plane I caused by a camera shake is corrected by moving the middle lens group G42 in the direction perpendicular to the optical axis.

Focusing from an infinity object to a close object is carried out by moving the third lens group G3 to the image plane I side.

In the wide-angle end state (W) in Example 2, the vibration reduction coefficient K is 2.56, and the focal length is 71.40 (mm), so that the moving amount of the middle lens group G42 for correcting a rotational camera shake of 0.30 degrees is 0.146 (mm). In the telephoto end state (T), the vibration reduction coefficient K is 2.56, and the focal length is 196.00 (mm), so that the moving amount of the middle lens group G42 for correcting a rotational camera shake of 0.15 degrees is 0.200 (mm).

Various values associated with the zoom lens system having a vibration reduction function according to Example 2 of the first embodiment are listed in Table 2.

TABLE 2

[Specifications]
Zoom Ratio: 2.7451

|  | W | M | T |
|---|---|---|---|
| f = | 71.40 | 135.00 | 196.00 |
| FNO = | 2.90 | 2.90 | 2.90 |
| 2ω = | 34.72 | 17.84 | 12.23 |
| Y = | 21.60 | 21.60 | 21.60 |
| TL = | 259.58 | 259.58 | 259.58 |
| Bf = | 42.10 | 42.10 | 42.10 |

[Lens Data]

| I | r | d | nd | νd |
|---|---|---|---|---|
| 1 | 135.1468 | 2.20 | 1.84666 | 23.78 |
| 2 | 84.9511 | 10.00 | 1.58913 | 61.16 |
| 3 | −813.1564 | 0.20 |  |  |
| 4 | 113.3913 | 7.00 | 1.51860 | 69.98 |
| 5 | 743.8242 | (d5) |  |  |
| 6 | −2245.4292 | 2.00 | 1.81600 | 46.62 |
| 7 | 56.2633 | 8.71 |  |  |
| 8 | −61.9401 | 2.00 | 1.74320 | 49.31 |
| 9 | 54.9894 | 6.58 | 1.84666 | 23.78 |
| 10 | −499.2235 | (d10) |  |  |
| 11 | −368.4063 | 3.00 | 1.84666 | 23.78 |
| 12 | −191.2623 | 0.10 |  |  |
| 13 | 140.9456 | 8.53 | 1.49782 | 82.52 |
| 14 | −47.6116 | 2.00 | 1.71736 | 29.52 |
| 15 | −86.4134 | (d15) |  |  |
| 16 | ∞ | 1.00 | Aperture Stop S |  |
| 17 | 59.0174 | 6.31 | 1.62299 | 58.22 |
| 18 | −140.9788 | 2.00 | 1.69895 | 30.13 |
| 19 | −1550.1599 | 7.11 |  |  |
| 20 | 42.6780 | 5.82 | 1.49782 | 82.52 |
| 21 | 255.8094 | 4.21 |  |  |
| 22 | −249.8902 | 7.00 | 1.84666 | 23.78 |
| 23 | −54.1617 | 2.00 | 1.62280 | 57.03 |
| 24 | 39.8633 | 4.72 |  |  |
| 25 | −101.2003 | 2.00 | 1.84666 | 23.78 |
| 26 | 47.6125 | 3.80 |  |  |
| 27 | 257.6495 | 4.20 | 1.61293 | 36.96 |
| 28 | −53.9609 | 0.10 |  |  |
| 29 | 53.2999 | 2.00 | 1.49782 | 82.52 |
| 30 | 46.7243 | 24.04 |  |  |
| 31 | 51.0023 | 7.56 | 1.49782 | 82.52 |
| 32 | −500.0000 | (Bf) |  |  |

[Variable Distances]

|  | W | M | T |
|---|---|---|---|
| (Focusing on Infinity) | | | |
| d5 | 5.92 | 39.20 | 49.96 |
| d10 | 45.40 | 22.77 | 2.00 |
| d15 | 29.97 | 19.32 | 29.34 |
| Bf | 42.10 | 42.10 | 42.10 |

TABLE 2-continued

|  | W | M | T |
|---|---|---|---|
| (Focusing on a Close Object) | | | |
| β | −0.053 | −0.084 | −0.106 |
| d0 | 1234 | 1234 | 1234 |
| d5 | 5.92 | 39.20 | 49.96 |
| d10 | 49.97 | 37.33 | 28.34 |
| d15 | 25.41 | 4.76 | 3.00 |
| Bf | 42.10 | 42.10 | 42.10 |

[Moving Amount for Focusing]

|  | W | M | T |
|---|---|---|---|
| f | 71.40 | 135.00 | 196.00 |
| δ3 | 4.5479 | 25.1720 | 26.9132 |

[Lens Group Data]

| Group | I | focal length |
|---|---|---|
| G1 | 1 | 128.998 |
| G2 | 6 | −41.471 |
| G3 | 11 | 107.972 |
| G4 | 17 | 125.658 |
| G41 | 17 | 52.344 |
| G42 | 22 | −22.839 |
| G43 | 27 | 50.872 |

[Values for Conditional Expressions]

| (1): f2/fw = | −0.581 |
|---|---|
| (2): f1/fw = | 1.807 |
| (3): f4/fw = | 1.760 |
| (4): f42/f4 = | −0.182 |
| (5): f41/f4 = | 0.417 |
| (6): f43/f4 = | 0.405 |

Figure 7A:
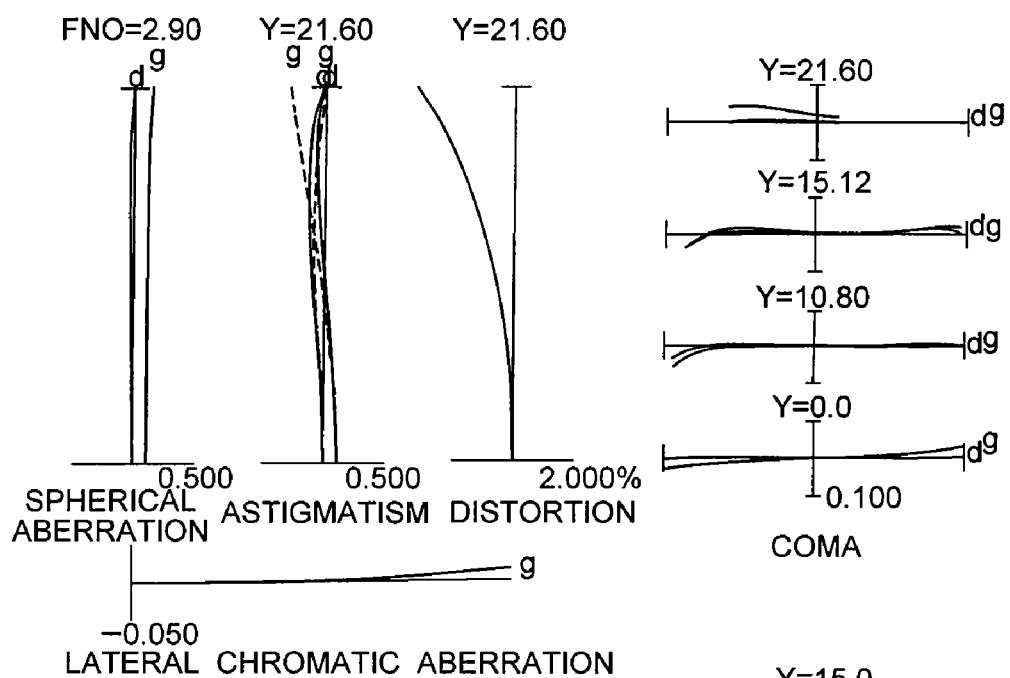
Figure 7B:
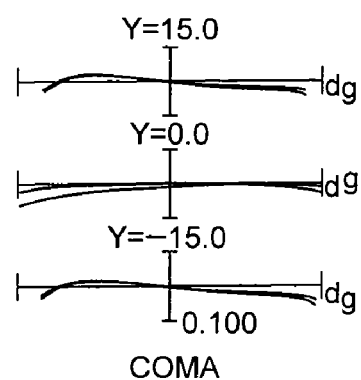
Figure 8:
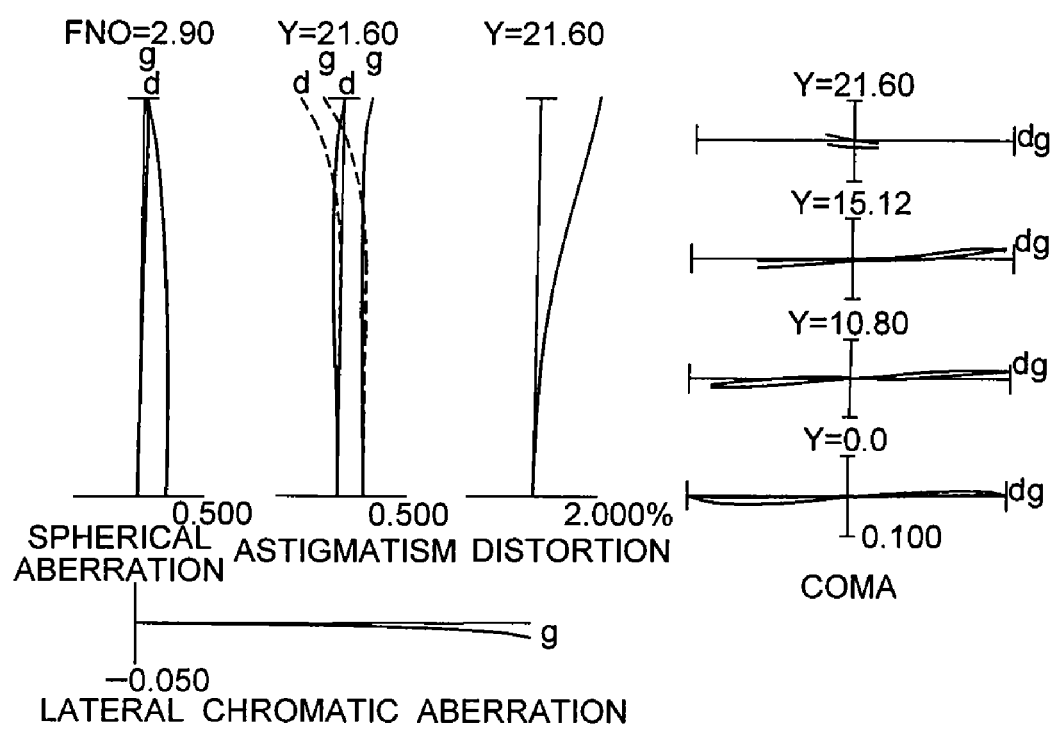
FIG. 8 shows various aberrations of the zoom lens system according to Example 2 in an intermediate focal length state upon focusing on infinity.
Figure 9A:
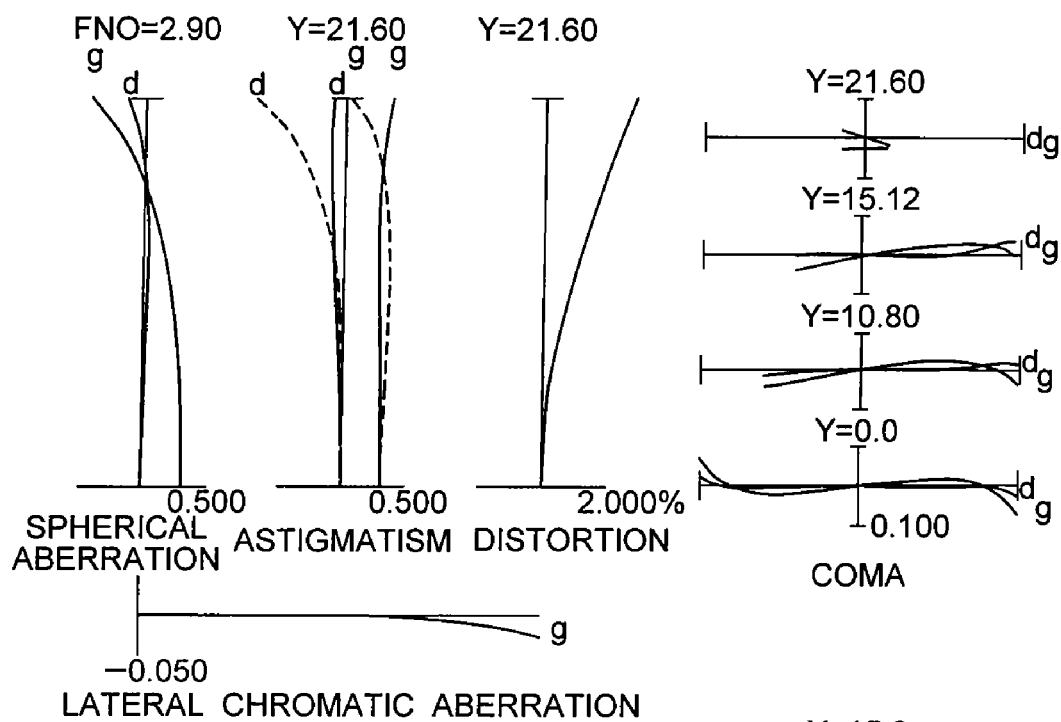
Figure 9B:
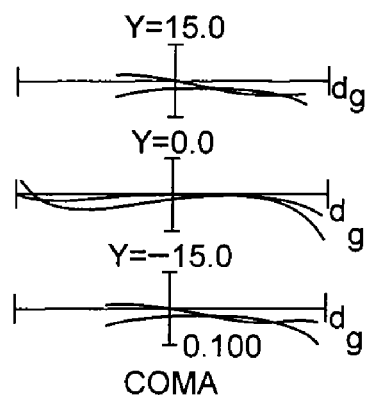
Figure 10A:
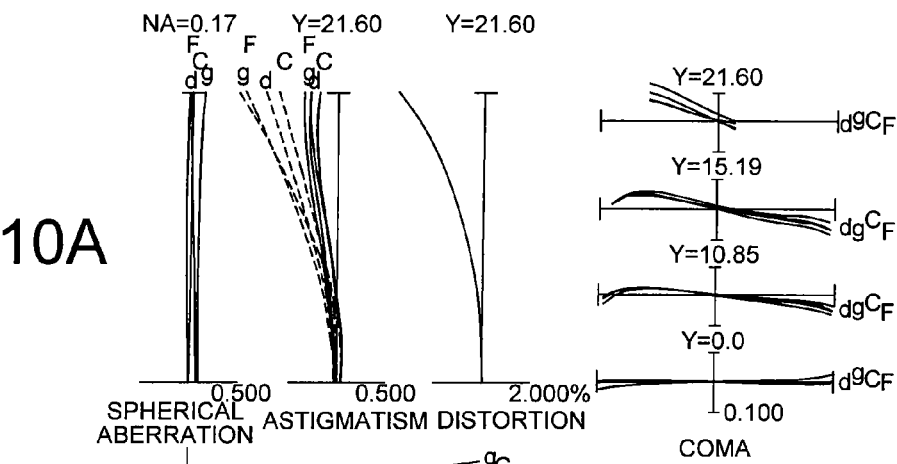
Figure 10B:
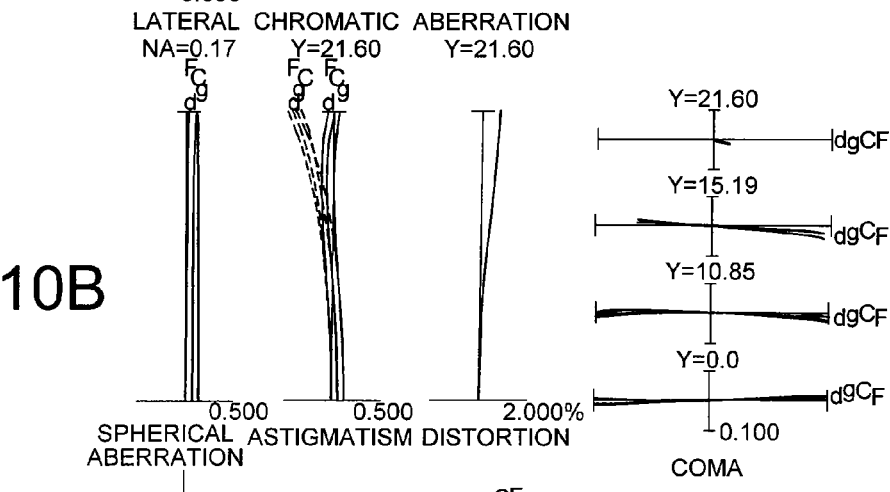
Figure 10C:
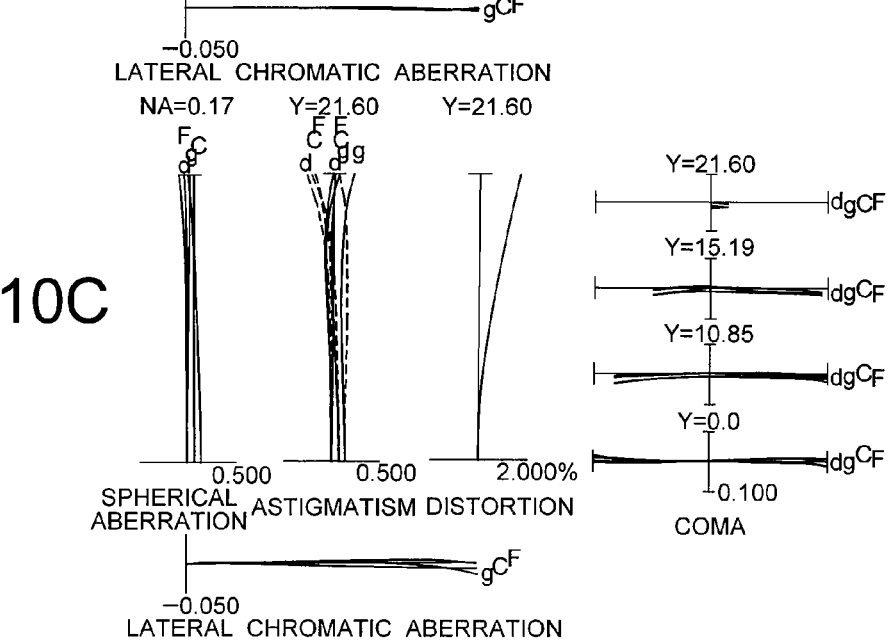

FIGS. 7A, and 7B are graphs showing various aberrations of the zoom lens system according to Example 2 in a wide-angle end state, in which FIG. 7A shows various aberrations upon focusing on infinity, FIG. 7B shows coma upon focusing on infinity upon correcting a rotational camera shake of 0.30 degrees. FIG. 8 shows various aberrations of the zoom lens system according to Example 2 in an intermediate focal length state upon focusing on infinity. FIGS. 9A, and 9B are graphs showing various aberrations of the zoom lens system according to Example 2 in a telephoto end state, in which FIG. 9A shows various aberrations upon focusing on infinity, and FIG. 9B shows coma upon focusing on infinity upon correcting a rotational camera shake of 0.15 degrees. FIGS. 10A, 10B and 10C are graphs showing various aberrations of the zoom lens system according to Example 2 upon focusing on a close object, in which FIG. 10A is in the wide-angle end state, FIG. 10B is in the intermediate focal length state, and FIG. 10C is in the telephoto end state.

As is apparent from the respective graphs, the zoom lens system having a vibration reduction function according to Example 2 of the first embodiment shows superb optical performance as a result of good corrections to various aberrations in the wide-angle end state, in the intermediate focal length state, and in the telephoto end state.

Example 3

Figure 11:
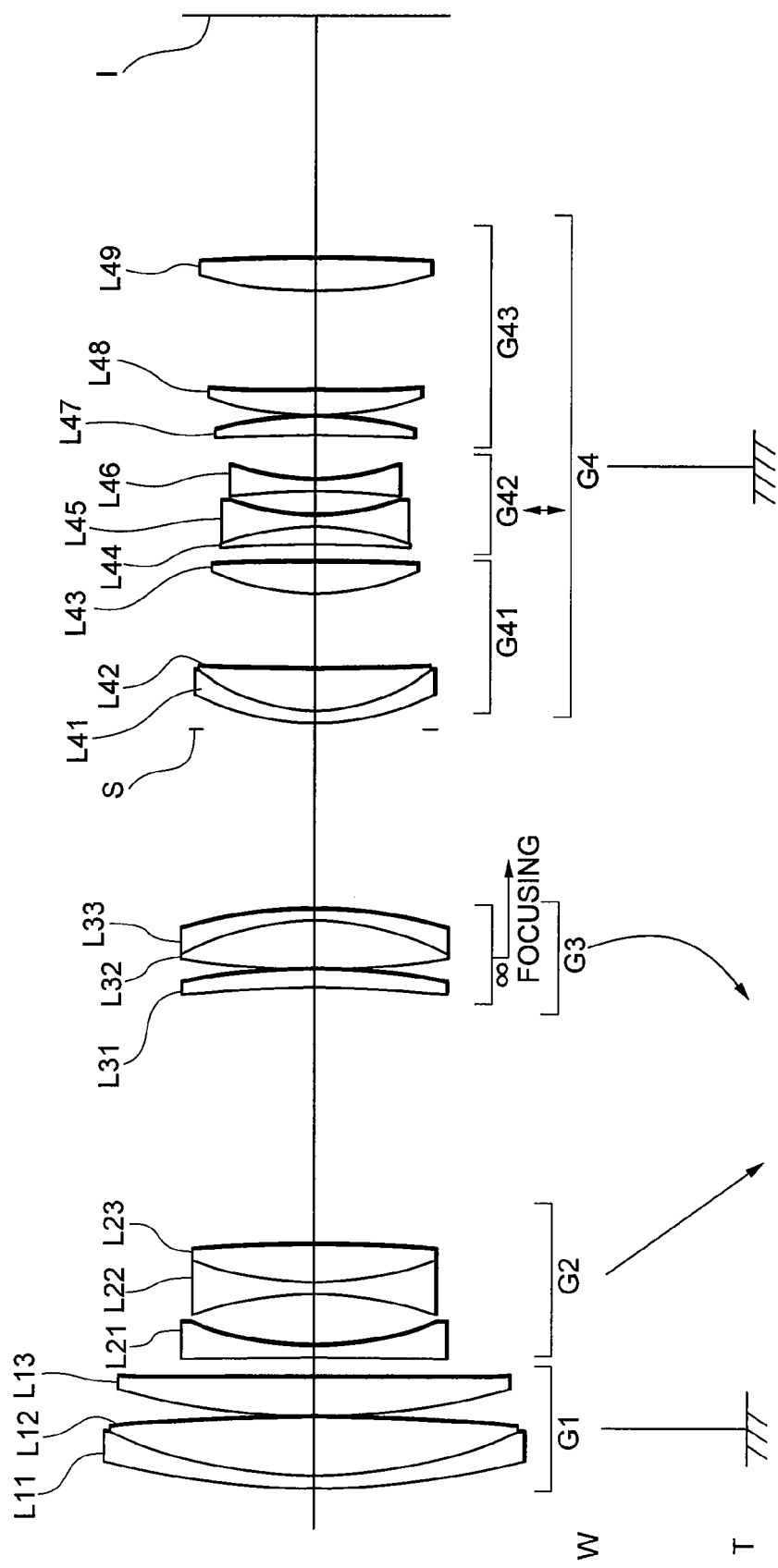
FIG. 11 is a sectional view showing a lens configuration of a zoom lens system having a vibration reduction function according to Example 3 of the first embodiment.

FIG. 11 is a sectional view showing a lens configuration of a zoom lens system having a vibration reduction function according to Example 3 of the first embodiment.

In FIG. 11, the zoom lens system having a vibration reduction function is composed of, in order from an object, a first lens group G1 having positive refractive power, a second lens group G2 having negative refractive power, a third lens group G3 having positive refractive power, and a fourth lens group G4 having positive refractive power. Upon zooming from a wide-angle end state (W) to a telephoto end state (T), the second lens group G2 moves to the image plane I side, the third lens group G3 moves at first to the image plane I side and then to the object side, and the first lens group G1 and the fourth lens group G4 are fixed such that a distance between the first lens group G1 and the second lens group G2 increases, and a distance between the second lens group G2 and the third lens group G3 decreases.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a double concave negative lens L21, and a cemented lens constructed by a double concave negative lens L22 cemented with a double convex positive lens L23.

The third lens group G3 is composed of, in order from the object, a positive meniscus lens L31 having a concave surface facing the object, and a cemented lens constructed by a double convex positive lens L32 cemented with a negative meniscus lens L33 having a concave surface facing the object.

The fourth lens group G4 is composed of, in order from the object, a front lens group G41 having positive refractive power, a middle lens group G42 having negative refractive power, and a rear lens group G43 having positive refractive power.

The front lens group G41 is composed of, in order from the object, a cemented lens constructed by a negative meniscus lens L41 having a convex surface facing the object cemented with a positive meniscus lens L42 having a convex surface facing the object, and a positive meniscus lens L43 having a convex surface facing the object.

The middle lens group G42 is composed of, in order from the object, a cemented lens constructed by a positive meniscus lens L44 having a convex surface facing the image plane I cemented with a double concave negative lens L45, and a double concave negative lens L46.

The rear lens group G43 is composed of, in order from the object, a positive meniscus lens L47 having a convex surface facing the image plane I side, a positive meniscus lens L48 having a convex surface facing the object, and a double convex positive lens L49.

An aperture stop S is disposed to the image plane I side of the third lens group G3, and is fixed together with the fourth lens group G4 upon zooming from the wide-angle end state (W) to the telephoto end state (T).

An image blur on the image plane I caused by a camera shake is corrected by moving the middle lens group G42 in the direction perpendicular to the optical axis.

Focusing from an infinity object to a close object is carried out by moving the third lens group G3 to the image plane I side.

In the wide-angle end state (W) in Example 3, the vibration reduction coefficient K is 2.78, and the focal length is 71.40 (mm), so that the moving amount of the middle lens group G42 for correcting a rotational camera shake of 0.30 degrees is 0.134 (mm). In the telephoto end state (T), the vibration reduction coefficient K is 2.78, and the focal length is 196.00 (mm), so that the moving amount of the middle lens group G42 for correcting a rotational camera shake of 0.15 degrees is 0.184 (mm).

Various values associated with the zoom lens system having a vibration reduction function according to Example 3 of the first embodiment are listed in Table 3.

TABLE 3

[Specifications]
Zoom Ratio: 2.7451

|  | W | M | T |
|---|---|---|---|
| f = | 71.40 | 135.00 | 196.00 |
| FNO = | 3.02 | 3.02 | 3.02 |
| 2ω = | 34.71 | 17.84 | 12.23 |
| Y = | 21.60 | 21.60 | 21.60 |
| TL = | 259.58 | 259.58 | 259.58 |
| Bf = | 42.10 | 42.10 | 42.10 |

[Lens Data]

| I | r | d | nd | νd |
|---|---|---|---|---|
| 1 | 132.9995 | 2.20 | 1.84666 | 23.78 |
| 2 | 84.7209 | 10.00 | 1.58913 | 61.16 |
| 3 | −834.2120 | 0.20 | | |
| 4 | 117.0800 | 7.00 | 1.51860 | 69.98 |
| 5 | 678.4791 | (d5) | | |
| 6 | −1546.1457 | 2.00 | 1.81600 | 46.62 |
| 7 | 56.8411 | 8.98 | | |
| 8 | −62.6006 | 2.00 | 1.74320 | 49.31 |
| 9 | 56.2242 | 6.73 | 1.84666 | 23.78 |
| 10 | −404.4946 | (d10) | | |
| 11 | −205.6680 | 3.00 | 1.84666 | 23.78 |
| 12 | −134.1959 | 0.10 | | |
| 13 | 135.3115 | 8.69 | 1.49782 | 82.52 |
| 14 | −49.3413 | 2.00 | 1.71736 | 29.52 |
| 15 | −91.3408 | (d15) | | |
| 16 | ∞ | 1.00 | Aperture Stop S | |
| 17 | 43.8010 | 2.00 | 1.79504 | 28.54 |
| 18 | 30.3927 | 7.39 | 1.62299 | 58.22 |
| 19 | 240.2602 | 13.61 | | |
| 20 | 39.4652 | 5.65 | 1.49782 | 82.52 |
| 21 | −746.3544 | 3.00 | | |
| 22 | −283.5358 | 3.25 | 1.84666 | 23.78 |
| 23 | −48.1954 | 2.00 | 1.73400 | 51.48 |
| 24 | 40.8414 | 4.20 | | |
| 25 | −143.8841 | 2.00 | 1.85026 | 32.35 |
| 26 | 37.3475 | 7.99 | | |
| 27 | −461.0082 | 3.30 | 1.58267 | 46.47 |
| 28 | −67.5637 | 0.10 | | |
| 29 | 52.9042 | 4.62 | 1.49782 | 82.52 |
| 30 | 500.0000 | 17.34 | | |
| 31 | 70.3832 | 5.75 | 1.49782 | 82.52 |
| 32 | −500.0000 | (Bf) | | |

[Variable Distances]

|  | W | M | T |
|---|---|---|---|
| (Focusing on Infinity) | | | |
| d5 | 3.67 | 38.76 | 50.00 |
| d10 | 45.46 | 22.82 | 2.00 |
| d15 | 32.22 | 19.79 | 29.37 |
| Bf | 42.10 | 42.10 | 42.10 |
| (Focusing on a Close Object) | | | |
| β | −0.053 | −0.084 | −0.106 |
| d0 | 1234 | 1234 | 1234 |
| d5 | 3.67 | 38.76 | 50.00 |
| d10 | 50.00 | 37.39 | 28.37 |
| d15 | 27.70 | 5.21 | 3.00 |
| Bf | 42.10 | 42.10 | 42.10 |

[Moving Amount for Focusing]

|  | W | M | T |
|---|---|---|---|
| f | 71.40 | 135.00 | 196.00 |
| δ3 | 4.5093 | 26.9686 | 29.1598 |

TABLE 3-continued

[Lens Group Data]

| Group | I | focal length |
|---|---|---|
| G1 | 1 | 131.205 |
| G2 | 6 | −42.429 |
| G3 | 11 | 108.322 |
| G4 | 17 | 129.185 |
| G41 | 17 | 48.622 |
| G42 | 22 | −19.827 |
| G43 | 27 | 47.10 |

[Values for Conditional Expressions]

| | |
|---|---|
| (1): f2/fw = | −0.594 |
| (2): f1/fw = | 1.838 |
| (3): f4/fw = | 1.809 |
| (4): f42/f4 = | −0.153 |
| (5): f41/f4 = | 0.376 |
| (6): f43/f4 = | 0.365 |

Figure 12A:
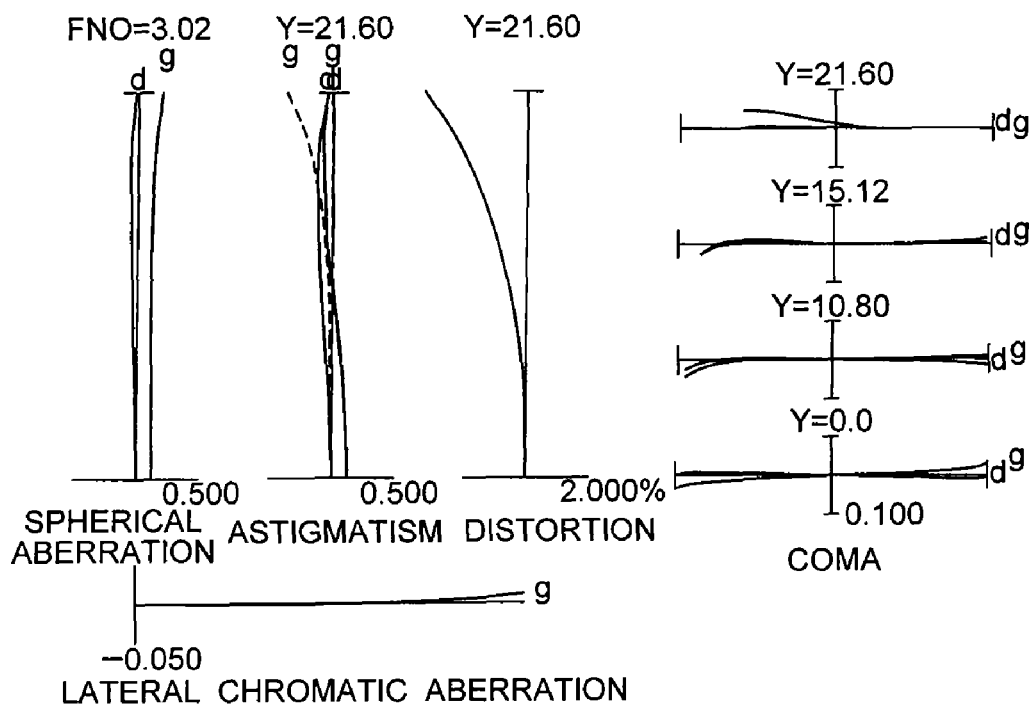
Figure 12B:
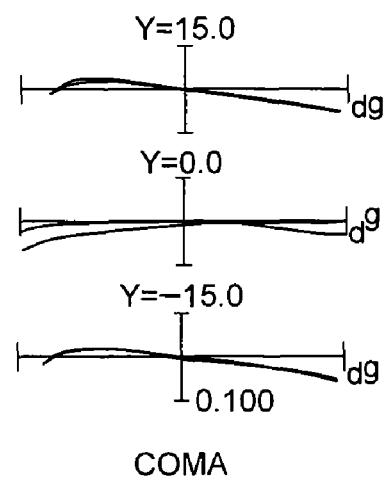
Figure 13:
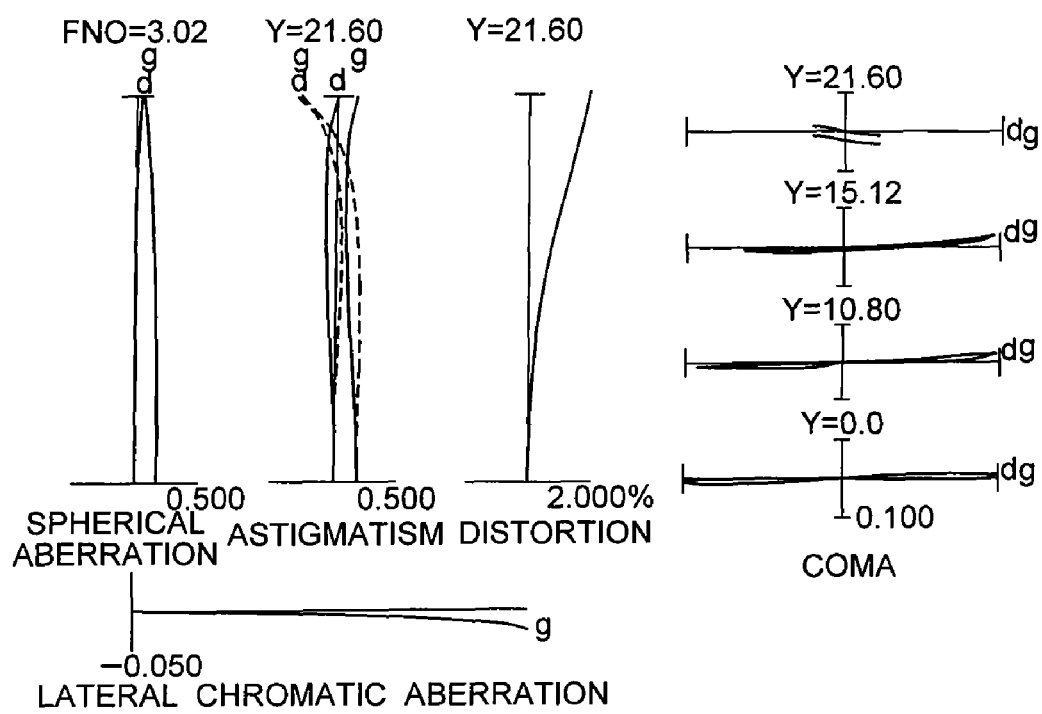
FIG. 13 shows various aberrations of the zoom lens system according to Example 3 in an intermediate focal length state upon focusing on infinity.
Figure 14A:
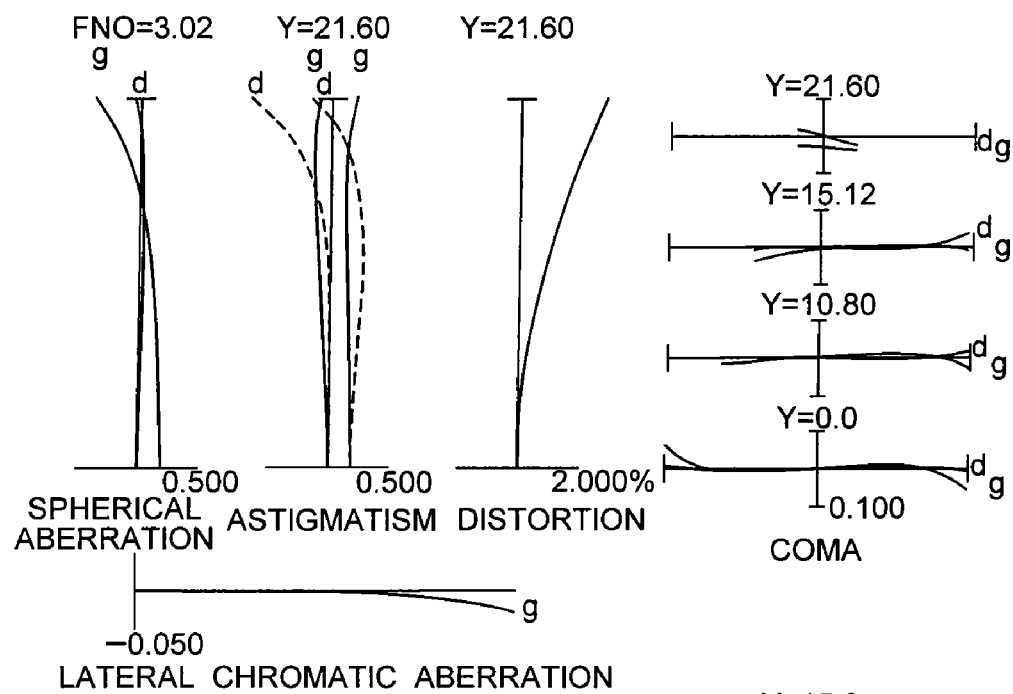
Figure 14B:
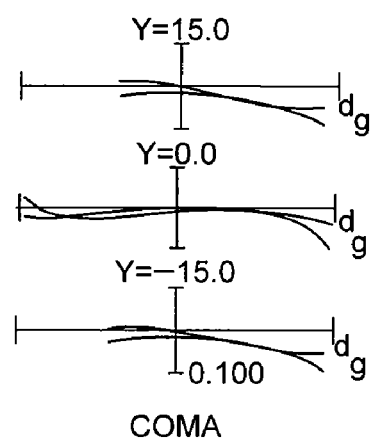
Figure 15A:
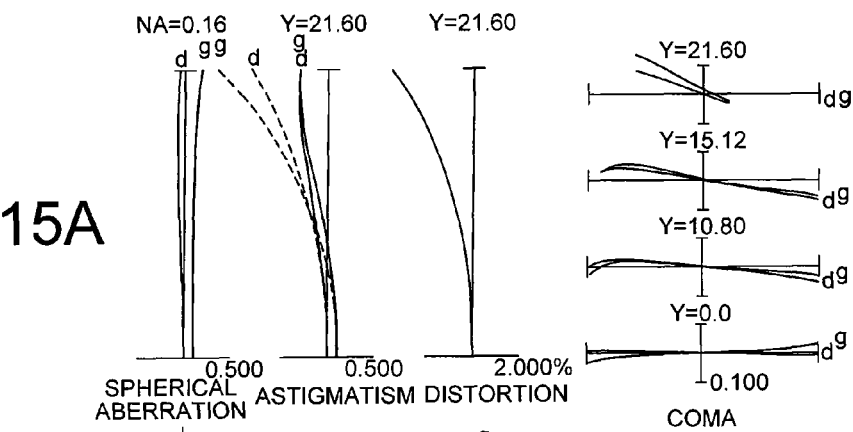
Figure 15B:
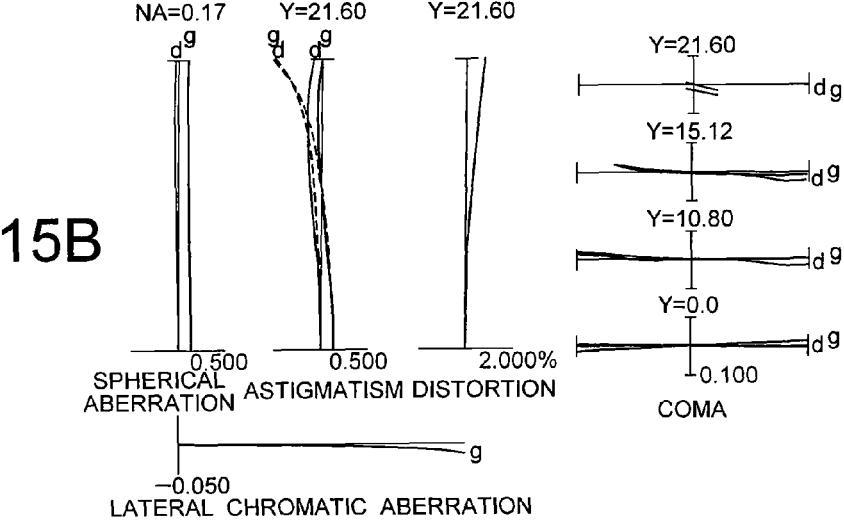
Figure 15C:
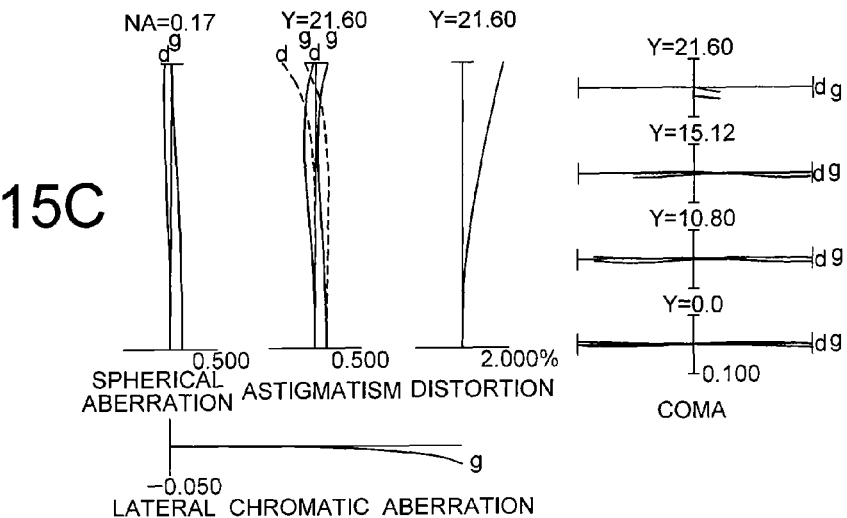

FIGS. 12A and 12B are graphs showing various aberrations of the zoom lens system according to Example 3 in a wide-angle end state, in which FIG. 12A shows various aberrations upon focusing on infinity, FIG. 12B shows coma upon focusing on infinity upon correcting a rotational camera shake of 0.30 degrees. FIG. 13 shows various aberrations of the zoom lens system according to Example 3 in an intermediate focal length state upon focusing on infinity. FIGS. 14A and 14B are graphs showing various aberrations of the zoom lens system according to Example 3 in a telephoto end state, in which FIG. 14A shows various aberrations upon focusing on infinity, and FIG. 14B shows coma upon focusing on infinity upon correcting a rotational camera shake of 0.15 degrees. FIGS. 15A, 15B and 15C are graphs showing various aberrations of the zoom lens system according to Example 3 upon focusing on a close object, in which FIG. 15A is in the wide-angle end state, FIG. 15B is in the intermediate focal length state, and FIG. 15C is in the telephoto end state.

As is apparent from the respective graphs, the zoom lens system having a vibration reduction function according to Example 3 of the first embodiment shows superb optical performance as a result of good corrections to various aberrations in the wide-angle end state, in the intermediate focal length state, and in the telephoto end state.

Second Embodiment

A zoom lens system having a vibration reduction function according to a second embodiment is explained below.

Figure 16:
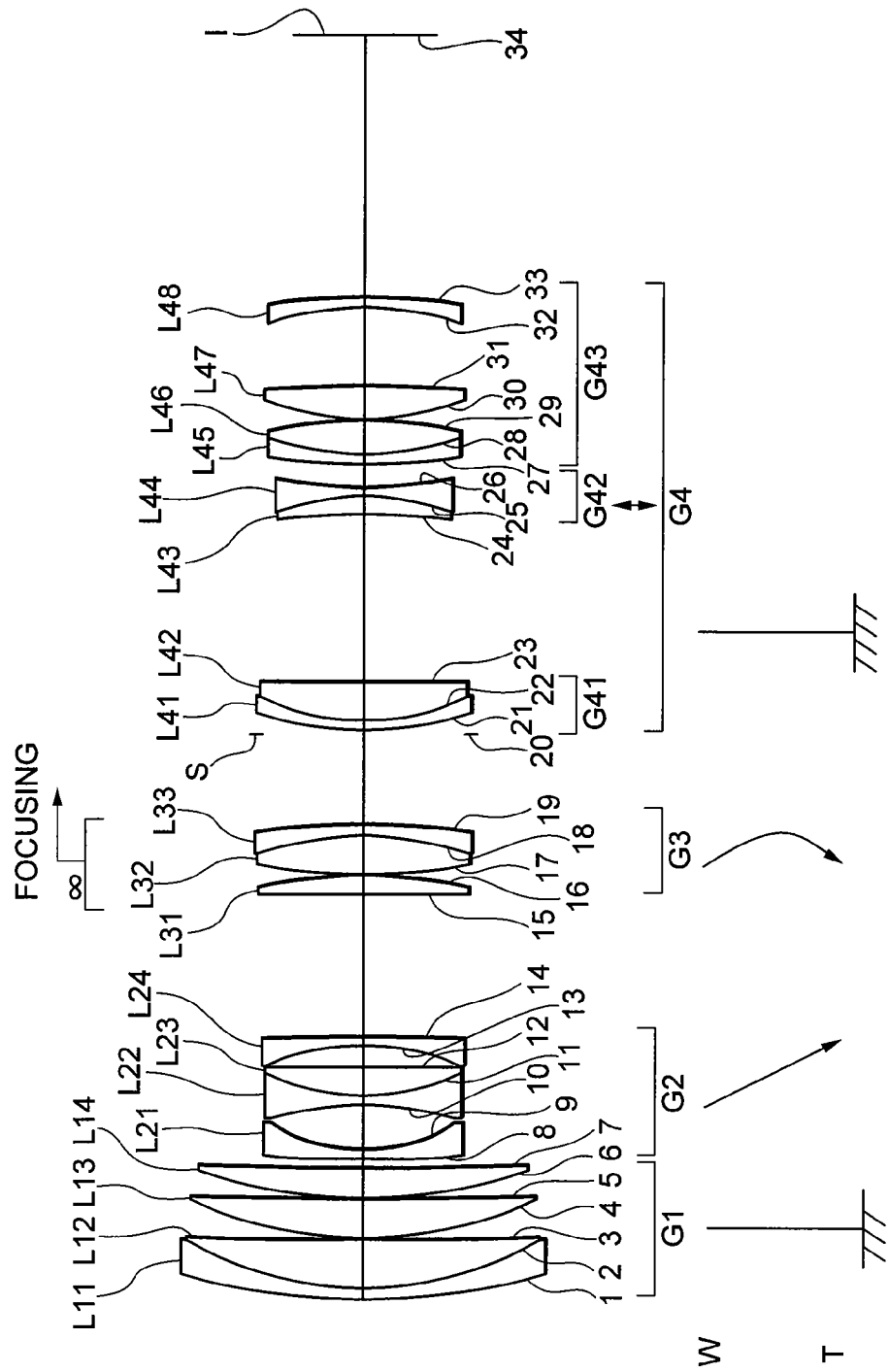
FIG. 16 is a sectional view showing a lens configuration of a zoom lens system having a vibration reduction function according to Example 4 of a second embodiment.

As shown in FIG. 16, a zoom lens system having a vibration reduction function includes, in order from an object, a first lens group G1 having positive refractive power, a second lens group G2 having negative refractive power, a third lens group G3 having positive refractive power, and a fourth G4 lens group having positive refractive power. The zoom lens system having a vibration reduction function shown in FIG. 16 is corresponding to Example 4, which will be described later.

In such a zoom lens system having a vibration reduction function, the fourth lens group G4 includes, in order from the object, a front lens group G41 having positive refractive power, and a middle lens group G42 having negative refractive power. In this case, the front lens group G41 preferably has a negative meniscus lens having a convex surface facing the object (such as a negative meniscus lens L41 in FIG. 16). With this configuration, longitudinal chromatic aberration can be effectively corrected. Moreover, since the middle lens group G42 has the smallest diameter among other lens groups or other sub-lens groups, as shown by a small arrow, vibration reduction is carried out by moving the middle lens group in a direction perpendicular to the optical axis. With this configuration, compactness of the lens barrel and correction of aberration upon vibration reduction can be carried out.

Moreover, the fourth lens group G4 preferably includes a rear lens group G43 having positive refractive power to the image side of the middle lens group.

The third lens group G3 preferably carries out focusing from an infinity object to a close object. Since the third lens group has fewer numbers of lenses in comparison with the other lens groups, it is suitable for carry out focusing. With this lens configuration, it becomes possible to obtain excellent optical performance even in photographing a close object without varying the total lens length.

Furthermore, in a zoom lens system having a vibration reduction function according to the second embodiment, it is preferable that upon zooming from a wide-angle end state to a telephoto end state, a distance between the first lens group G1 and the second lens group G2 increases, and a distance between the second lens group G2 and the third lens group G3 decreases. With this lens configuration, it becomes possible to keep the image plane constant with securing sufficient zoom ratio.

In a zoom lens system having a vibration reduction function according to the second embodiment, upon zooming from the wide-angle end state to the telephoto end state, the first lens group G1 is preferably fixed. With this lens configuration, it becomes advantageous to simplify the zoom mechanism. Moreover, in a zoom lens system having a vibration reduction function according to the second embodiment, upon zooming from the wide-angle end state to the telephoto end state, the fourth lens group G1 is preferably fixed. With this lens configuration, it becomes advantageous to simplify the zoom mechanism. Furthermore, when the first lens group G1 and the fourth lens group G4 are fixed upon zooming from the wide-angle end state to the telephoto end state, the total lens length of the zoom lens system having a vibration reduction function can be kept constant.

Then, conditions for configuring a zoom lens system having a vibration reduction function according to the second embodiment is explained below. The following conditional expression (7) is preferably satisfied:

$$0.8 < f1/f3 < 1.3 \quad (7)$$

where f1 denotes a focal length of the first lens group G1, and f3 denotes a focal length of the third lens group.

Conditional expression (7) defines the focal length of the first lens group G1 relative to that of the third lens group G3. With satisfying conditional expression (7), it becomes possible to make the zoom lens system compact. Moreover, it becomes possible to obtain excellent optical performance even in photographing a close object. In other words, it is needless to say upon focusing on infinity, the zoom lens system is capable of suppressing variation in aberration upon focusing on a close object. When the ratio f1/f3 is equal to or exceeds the upper limit of conditional expression (7), refractive index of the first lens group G1 becomes weak, so that the total lens length of the zoom lens system becomes large. Otherwise, refractive power of the third lens group G3 becomes strong, so that it becomes difficult to suppress variations in spherical aberration and curvature of field. Accordingly, it is undesirable. On the other hand, when the ratio f1/f3 is equal to or falls below the lower limit of conditional expression (7), refractive power of the first lens group G1 becomes strong, and it becomes difficult to correct spherical aberration, and longitudinal chromatic aberration and lateral chromatic aberration in the telephoto end state, so that it is undesirable. In order to secure the effect of the second embodiment, it is preferable to set the upper limit of conditional expression (7) to 1.2. In order to secure the effect of the second embodiment, it is preferable to set the lower limit of conditional expression (7) to 0.9.

In a zoom lens system having a vibration reduction function according to the second embodiment, the following conditional expression (8) is preferably satisfied:

$$0.5 < f3/f4 < 1.2 \quad (8)$$

where f3 denotes a focal length of the third lens group G3, and f4 denotes a focal length of the fourth lens group G4.

Conditional expression (8) defines an appropriate range of the ratio of the focal length of the third lens group G3 to that of the fourth lens group G4. With satisfying conditional expression (8), it becomes possible to obtain excellent optical performance even in photographing a close object. When the ratio f3/f4 is equal to or exceeds the upper limit of conditional expression (8), refractive power of the fourth lens group G4 becomes strong, so that it becomes difficult to correct spherical aberration in the telephoto end state. Moreover, it becomes difficult to correct curvature of field and astigmatism, so that it is undesirable. On the other hands, when the ratio f3/f4 is equal to or falls below the lower limit of conditional expression (8), refractive power of the third lens group becomes strong, and it becomes difficult to suppress variations in spherical aberration and curvature of field, so that it is undesirable. In order to secure the effect of the second embodiment, it is preferable to set the upper limit of conditional expression (8) to 1.0. In order to secure the effect of the second embodiment, it is preferable to set the lower limit of conditional expression (8) to 0.6.

In a zoom lens system having a vibration reduction function according to the second embodiment, the front lens group G41 composing the fourth lens group G4 preferably includes, in order from the object, a negative meniscus lens (the negative meniscus lens L41 in FIG. 16) having a convex surface facing the object, and a positive lens (the positive meniscus lens L42 in FIG. 16). The negative meniscus lens and the positive lens may be a cemented lens, or may be independent lenses with an air space in between. Moreover, the radius of curvature of the image side surface of the negative meniscus lens, which is the radius of curvature of the object side surface of the positive lens, is preferable smaller than those of the other lens surfaces including in the front lens group G41.

In a zoom lens system having a vibration reduction function according to the second embodiment, the middle lens group G42 composing the fourth lens group G4 is preferably composed of a cemented lens. With this lens configuration, the vibration reductioN-th lens group can be light, and it becomes possible to make the lens barrel of the zoom lens system and the vibration reduction mechanism compact. The middle lens group G42 is preferably composed of a cemented lens constructed by, in order from the object, a positive lens cemented with a negative lens. The positive lens included in the middle lens group G42 is preferably a positive meniscus lens having a convex surface facing the image side (such as a positive meniscus lens L43 in FIG. 16), and the negative lens included in the middle lens group G42 is preferably a double concave negative lens (such as the double concave negative lens L44 in FIG. 16).

In a zoom lens system having a vibration reduction function according to the second embodiment, the rear lens group G43 composing the fourth lens group G4 is preferably has at least three lens components. Moreover, the rear lens group G43 includes, in order from the object, two positive lens components (such as a cemented positive lens constructed by a negative meniscus lens L45 cemented with a double convex positive lens L46, and a double convex positive lens L47 in FIG. 16) and a negative lens component (such as a negative meniscus lens L48 in FIG. 16). An air space is preferably there between each lens component composing the rear lens group G43, and the air space between second positive lens component counted in order from the object and the negative lens component is preferably wider than that between the two positive lens components. The first positive lens component counted in order from the object is preferably composed of a cemented lens constructed by a negative lens cemented with a positive lens.

Each example of the second embodiment is explained below with reference to accompanying drawings. FIG. 16 is a sectional view showing a lens configuration of a zoom lens system having a vibration reduction function according to Example 4 of a second embodiment together with zoom trajectory of each lens group upon zooming from a wide-angle end state (W) to a telephoto end state (T). As shown in FIG. 16, a zoom lens system having a vibration reduction function according to the second embodiment is composed of, in order from an object, a first lens group G1 having positive refractive power, a second lens group G2 having negative refractive power, a third lens group G3 having positive refractive power, and a fourth lens group G4 having positive refractive power. The fourth lens group G4 is composed of, in order from the object, a front lens group G41 having positive refractive power, a middle lens group G42 having positive refractive power, and a rear lens group having positive refractive power. Upon zooming from the wide-angle end state to the telephoto end state, the first lens group G1 and the fourth lens group G4 are fixed, and the second lens group G2 and the third lens group G3 are moved along an optical axis as shown in FIG. 16 such that a distance between the first lend group G1 and the second lens group G2 increases, and a distance between the second lens group G2 and the third lens group G3 decreases, and a distance between the third lens group G3 and the fourth lens group G4 varies. Focusing from an infinity object to a close object is carried out by moving the third lens group along the optical axis to the image plane I side. With moving the middle lens group G42 in a direction perpendicular to the optical axis, vibration reduction is carried out.

Example 4

FIG. 16 is a sectional view showing a lens configuration of a zoom lens system having a vibration reduction function according to Example 4 of a second embodiment. As shown in FIG. 16, the first lens group G1 is composed of, in order from the object, a cemented lens constructed by a negative meniscus lens L11 having a convex surface facing the object cemented with a positive meniscus lens L12 having a convex surface facing the object, a positive meniscus lens L13 having a convex surface facing the object, and a positive meniscus lens L14 having a convex surface facing the object. The second lens group G2 is composed of, in order from the object, a negative meniscus lens L21 having a convex surface facing the object, a cemented lens constructed by a double concave negative lens L22 cemented with a positive meniscus lens L23 having a convex surface facing the object, and a negative meniscus lens L24 having a concave surface facing the object. The third lens group G3 is composed of, in order from the object, a positive meniscus lens L31 having a concave surface facing the object, and a cemented lens constructed by a double convex positive lens L32 cemented with a negative meniscus lens L33 having a concave surface facing the object. The fourth lens group G4 is composed of, in order from the object, a front lens group G41 having positive refractive power, a middle lens group G42 having negative refractive power, and a rear lens group G43 having positive refractive power. The front lens group G41 is composed of a cemented lens constructed by, in order from the object, a negative meniscus lens L41 having a convex surface facing the object cemented with a positive meniscus lens L42 having a convex surface facing the object. The middle lens group G42 is composed of a cemented lens constructed by, in order from the object, a positive meniscus lens L43 having a concave surface facing the object cemented with a double concave negative lens L44. The rear lens group G43 is composed of, in order from the object, a cemented lens constructed by a negative meniscus lens L45 having a convex surface facing the object cemented with a double convex positive lens L46, a double convex positive lens L47, and a negative meniscus lens L48 having a concave surface facing the object. An aperture stop S is disposed to the most object side of the fourth lens group G4.

In the wide-angle end state (W) in Example 4 of the second embodiment, the vibration reduction coefficient K is 0.80, and the focal length is 71.40 (mm), so that the moving amount of the middle lens group G42 for correcting a rotational camera shake of 0.40 degrees is 0.62 (mm). In the telephoto end state (T), the vibration reduction coefficient K is 0.80, and the focal length is 196.00 (mm), so that the moving amount of the middle lens group G42 for correcting a rotational camera shake of 0.20 degrees is 0.86 (mm).

Various values associated with the zoom lens system having a vibration reduction function according to Example 4 of the second embodiment are listed in Table 4.

TABLE 4

[Specifications]
Zoom Ratio: 2.745

|  | W | M | T |
|---|---|---|---|
| f = | 71.40 | 135.00 | 196.00 |
| FNO = | 2.90 | 2.90 | 2.90 |
| 2ω = | 34.18 | 17.78 | 12.20 |
| Y = | 21.60 | 21.60 | 21.60 |
| TL = | 259.180 | 259.180 | 259.180 |
| Bf = | 52.969 | 52.969 | 52.969 |

[Lens Data]

| I | r | d | nd | vd |
|---|---|---|---|---|
| 1 | 134.3991 | 2.000 | 1.850260 | 32.35 |
| 2 | 69.5163 | 10.000 | 1.497820 | 82.52 |
| 3 | 1018.5520 | 0.100 | | |
| 4 | 78.6963 | 8.000 | 1.497820 | 82.52 |
| 5 | 724.9624 | 0.100 | | |
| 6 | 99.2266 | 6.000 | 1.603001 | 65.46 |
| 7 | 578.6701 | (d7) | | |
| 8 | 265.5800 | 1.800 | 1.834000 | 37.16 |
| 9 | 33.0667 | 9.019 | | |
| 10 | −67.3753 | 1.800 | 1.497820 | 82.52 |
| 11 | 40.5532 | 6.000 | 1.846660 | 23.78 |
| 12 | 1668.2091 | 4.293 | | |
| 13 | −48.6403 | 1.800 | 1.618000 | 63.37 |
| 14 | −792.4848 | (d14) | | |
| 15 | −14921.701 | 4.000 | 1.766840 | 46.80 |
| 16 | −88.3869 | 0.100 | | |
| 17 | 102.6474 | 8.000 | 1.497820 | 82.52 |
| 18 | −61.2775 | 2.000 | 1.850260 | 32.35 |
| 19 | −200.0915 | (d19) | | |
| 20 | ∞ | 1.000 | Aperture Stop S | |
| 21 | 60.0000 | 2.000 | 1.850260 | 32.35 |
| 22 | 45.3031 | 8.000 | 1.497820 | 82.52 |

TABLE 4-continued

| 23 | 1316.1848 | 35.000 | | |
| 24 | −149.1501 | 4.000 | 1.834000 | 37.16 |
| 25 | −45.8221 | 1.500 | 1.603001 | 65.46 |
| 26 | 65.4819 | 5.000 | | |
| 27 | 124.1362 | 2.000 | 1.850260 | 32.35 |
| 28 | 50.9390 | 7.000 | 1.497820 | 82.52 |
| 29 | −97.6523 | 0.100 | | |
| 30 | 46.6990 | 7.000 | 1.497820 | 82.52 |
| 31 | −298.0953 | 16.171 | | |
| 32 | −58.0666 | 2.000 | 1.696797 | 55.52 |
| 33 | −127.9529 | (Bf) | | |

[Variable Distances]

|  | W | M | T |
|---|---|---|---|
| (Focusing on Infinity) | | | |
| f | 71.400 | 135.000 | 196.000 |
| d7 | 2.000 | 23.456 | 30.877 |
| d14 | 29.477 | 15.391 | 2.000 |
| d19 | 18.951 | 11.581 | 17.551 |
| Bf | 52.969 | 52.969 | 52.969 |
| (Focusing on a Close Object) | | | |
| β | −0.040 | −0.070 | −0.090 |
| d0 | 1689.317 | 1673.075 | 1769.033 |
| d7 | 2.000 | 23.456 | 30.877 |
| d14 | 31.026 | 20.552 | 11.609 |
| d19 | 17.401 | 6.419 | 7.941 |
| Bf | 52.969 | 52.969 | 52.969 |

[Moving Amount for Focusing]

|  | W | M | T |
|---|---|---|---|
| f | 71.400 | 135.000 | 196.000 |
| δ3 | 1.550 | 5.162 | 9.609 |

[Lens Group Data]

| Group | I | focal length |
|---|---|---|
| G1 | 1 | 89.295 |
| G2 | 8 | −26.730 |
| G3 | 15 | 83.047 |
| G4 | 21 | 119.019 |
| G41 | 21 | 162.568 |
| G42 | 24 | −101.893 |
| G43 | 27 | 77.597 |

[Values for Conditional Expressions]

| (7): f1/f3 = | 1.08 |
|---|---|
| (8): f3/f4 = | 0.70 |

Figure 17A:
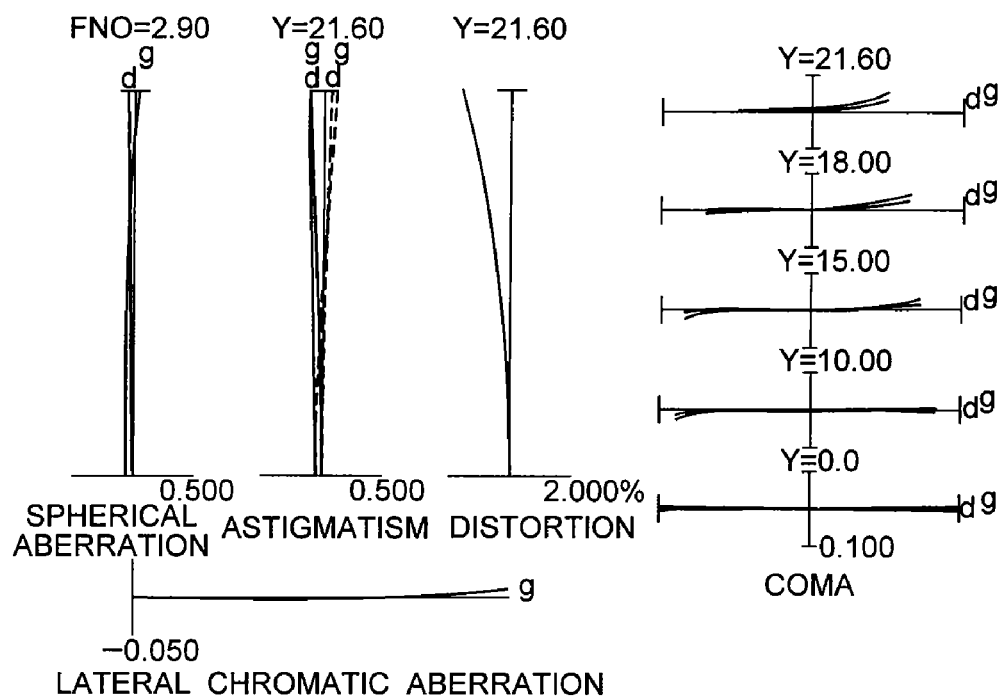
Figure 17B:
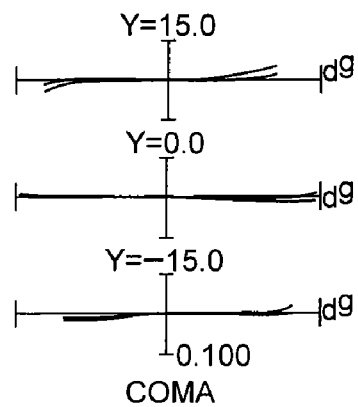
Figure 18:
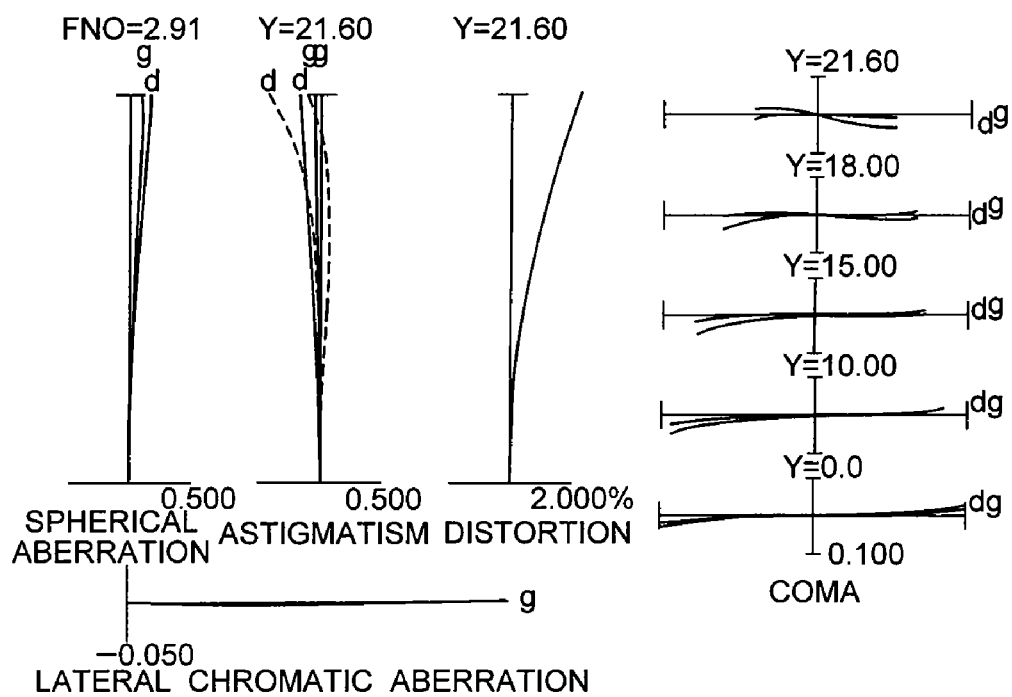
FIG. 18 shows various aberrations of the zoom lens system according to Example 4 in an intermediate focal length state upon focusing on infinity.
Figure 19A:
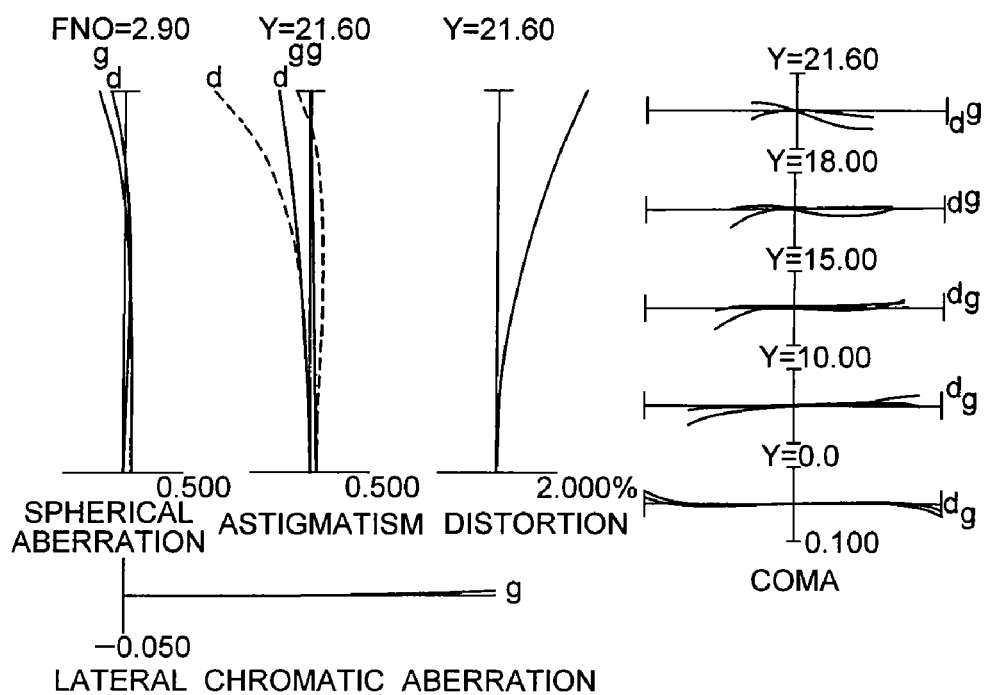
Figure 19B:
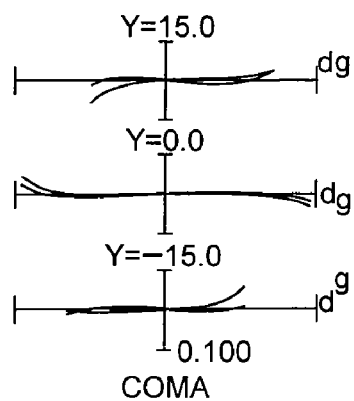
Figure 20A:
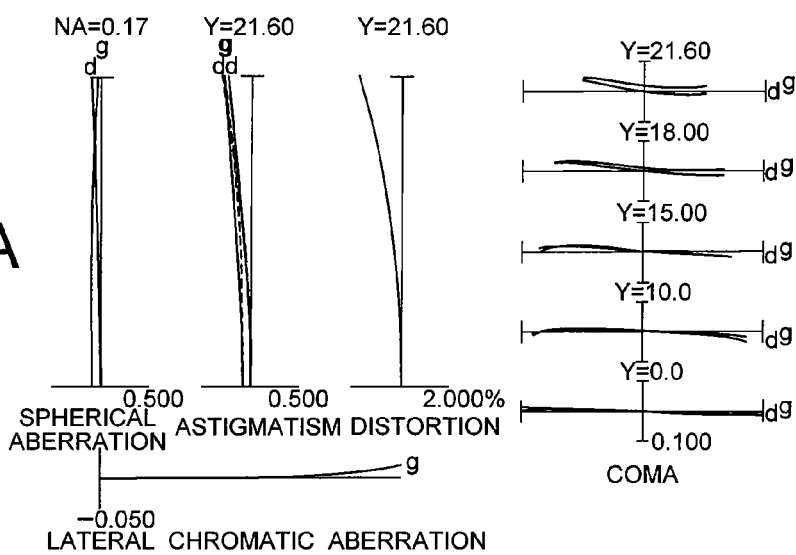
Figure 20B:
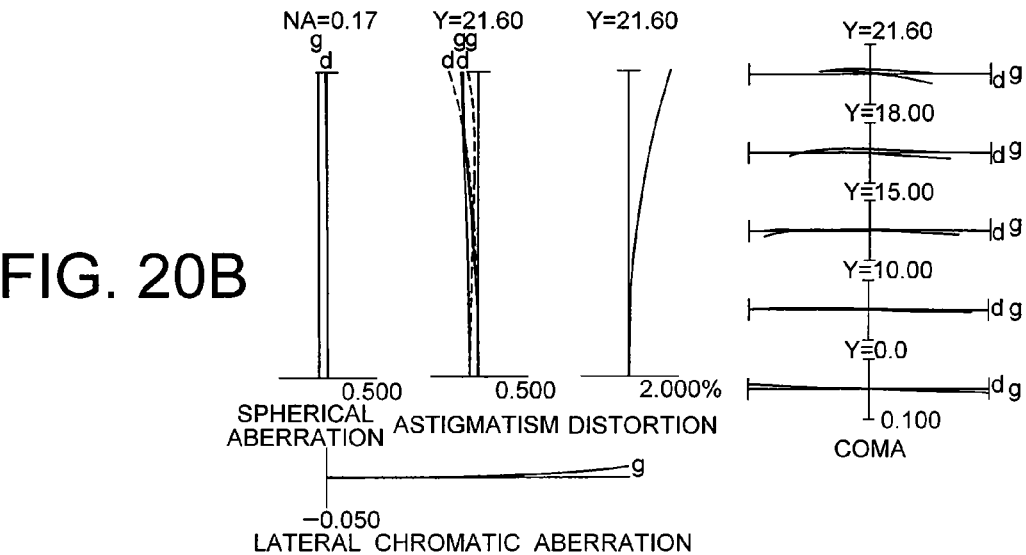
Figure 20C:
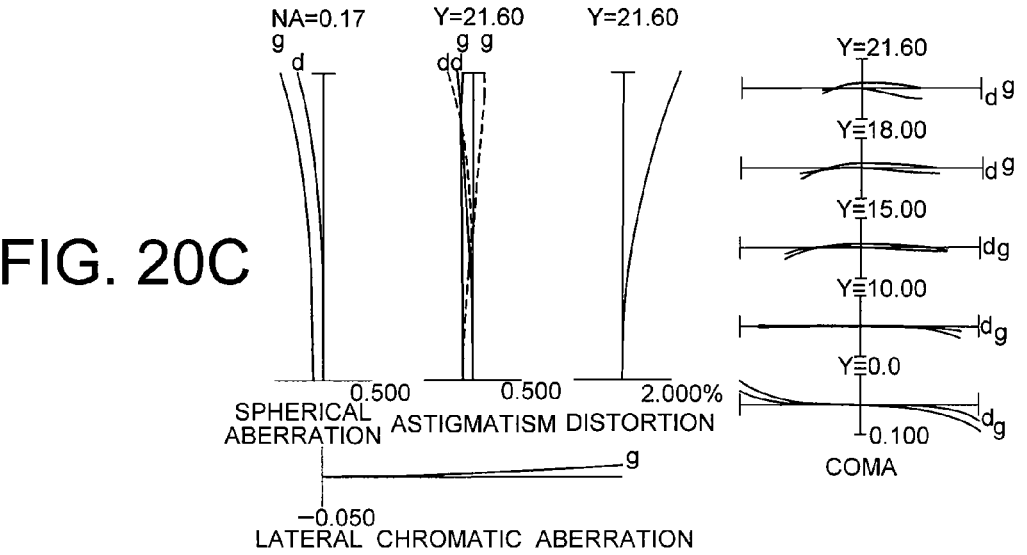

FIGS. 17A, and 17B are graphs showing various aberrations of the zoom lens system according to Example 4 in a wide-angle end state, in which FIG. 17A shows various aberrations upon focusing on infinity, FIG. 17B shows coma upon focusing on infinity upon correcting a rotational camera shake of 0.40 degrees. FIG. 18 shows various aberrations of the zoom lens system according to Example 4 in an intermediate focal length state upon focusing on infinity. FIGS. 19A, and 19B are graphs showing various aberrations of the zoom lens system according to Example 4 in a telephoto end state, in which FIG. 19A shows various aberrations upon focusing on infinity, and FIG. 19B shows coma upon focusing on infinity upon correcting a rotational camera shake of 0.20 degrees. FIGS. 20A, 20B and 20C are graphs showing various aberrations of the zoom lens system according to Example 4 upon focusing on a close object, in which FIG. 20A is in the wide-angle end state, FIG. 20B is in the intermediate focal length state, and FIG. 20C is in the telephoto end state.

As is apparent from the respective graphs, the zoom lens system having a vibration reduction function according to Example 4 of the second embodiment shows superb optical performance as a result of good corrections to various aberrations in the wide-angle end state, in the intermediate focal length state, and in the telephoto end state.

Example 5

Figure 21:
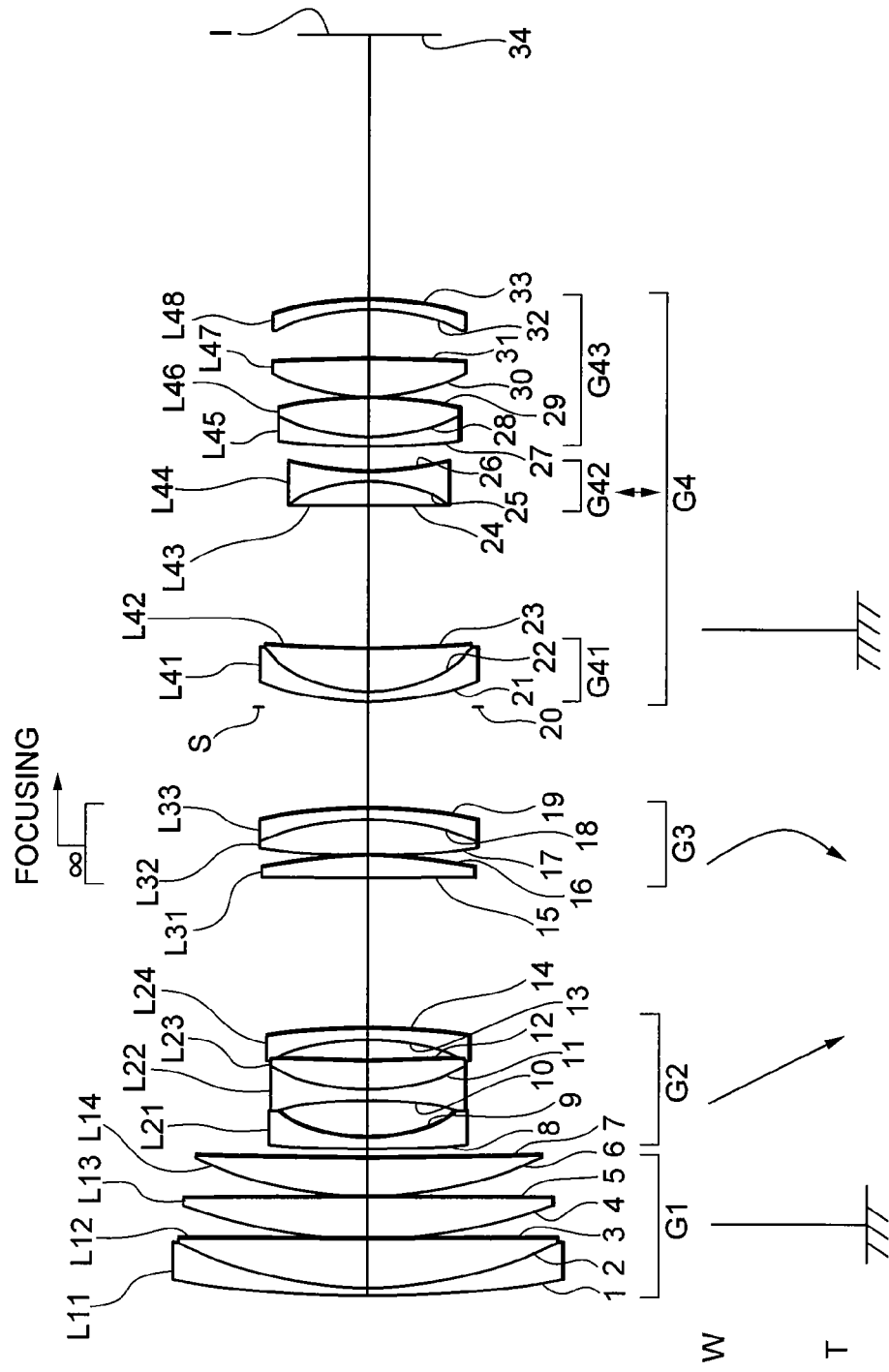
FIG. 21 is a sectional view showing a lens configuration of a zoom lens system having a vibration reduction function according to Example 5 of the second embodiment.

FIG. 21 is a sectional view showing a lens configuration of a zoom lens system having a vibration reduction function according to Example 5 of the second embodiment. As shown in FIG. 21, the first lens group G1 is composed of, in order from the object, a cemented lens constructed by a negative meniscus lens L11 having a convex surface facing the object cemented with a positive meniscus lens L12 having a convex surface facing the object, a double convex positive lens L13, and a positive meniscus lens L14 having a convex surface facing the object. The second lens group G2 is composed of, in order from the object, a negative meniscus lens L21 having a convex surface facing the object, a cemented lens constructed by a double concave negative lens L22 cemented with a positive meniscus lens L23 having a convex surface facing the object, and a negative meniscus lens L24 having a concave surface facing the object. The third lens group G3 is composed of, in order from the object, a positive meniscus lens L31 having a concave surface facing the object, and a cemented lens constructed by a double convex positive lens L32 cemented with a negative meniscus lens L33 having a concave surface facing the object. The fourth lens group G4 is composed of, in order from the object, a front lens group G41 having positive refractive power, a middle lens group G42 having negative refractive power, and a rear lens group G43 having positive refractive power. The front lens group G41 is composed of a cemented lens constructed by, in order from the object, a negative meniscus lens L41 having a convex surface facing the object cemented with a positive meniscus lens L42 having a convex surface facing the object. The middle lens group G42 is composed of a cemented lens constructed by, in order from the object, a positive meniscus lens L43 having a concave surface facing the object cemented with a double concave negative lens L44. The rear lens group G43 is composed of, in order from the object, a cemented lens constructed by a negative meniscus lens L45 having a convex surface facing the object cemented with a double convex positive lens L46, a double convex positive lens L47, and a negative meniscus lens L48 having a concave surface facing the object. An aperture stop S is disposed to the most object side of the fourth lens group G4.

In the wide-angle end state (W) in Example 5 of the second embodiment, the vibration reduction coefficient K is 1.00, and the focal length is 71.40 (mm), so that the moving amount of the middle lens group G42 for correcting a rotational camera shake of 0.40 degrees is 0.50 (mm). In the telephoto end state (T), the vibration reduction coefficient K is 1.00, and the focal length is 196.00 (mm), so that the moving amount of the middle lens group G42 for correcting a rotational camera shake of 0.20 degrees is 0.68 (mm).

Various values associated with the zoom lens system having a vibration reduction function according to Example 5 of the second embodiment are listed in Table 5.

TABLE 5

[Specifications]
Zoom Ratio: 2.745

|  | W | M | T |
|---|---|---|---|
| f = | 71.40 | 135.00 | 196.00 |
| FNO = | 2.90 | 2.90 | 2.90 |
| 2ω = | 34.12 | 17.76 | 12.21 |
| Y = | 21.60 | 21.60 | 21.60 |
| TL = | 259.180 | 259.180 | 259.180 |
| Bf = | 53.445 | 53.445 | 53.445 |

[Lens Data]

| I | r | d | nd | vd |
|---|---|---|---|---|
| 1 | 213.2625 | 2.000 | 1.850260 | 32.35 |
| 2 | 83.9093 | 10.000 | 1.497820 | 82.52 |
| 3 | 1658.5174 | 0.100 | | |
| 4 | 104.1537 | 8.500 | 1.497820 | 82.52 |
| 5 | −20142.024 | 0.100 | | |
| 6 | 84.2773 | 7.500 | 1.603001 | 65.46 |
| 7 | 817.7984 | (d7) | | |
| 8 | 313.9238 | 2.200 | 1.834807 | 42.72 |
| 9 | 33.5757 | 7.661 | | |
| 10 | −75.7612 | 2.000 | 1.487490 | 70.41 |
| 11 | 40.6855 | 6.000 | 1.846660 | 23.78 |
| 12 | 390.5792 | 4.407 | | |
| 13 | −46.5395 | 2.200 | 1.622990 | 58.22 |
| 14 | −158.0440 | (d14) | | |
| 15 | −2307.6586 | 4.500 | 1.766840 | 46.80 |
| 16 | −104.6037 | 0.100 | | |
| 17 | 151.1718 | 7.500 | 1.497820 | 82.52 |
| 18 | −57.3586 | 2.000 | 1.834000 | 37.16 |
| 19 | −129.0561 | (d19) | | |
| 20 | ∞ | 1.000 | Aperture Stop S | |
| 21 | 60.0000 | 2.000 | 1.728250 | 28.46 |
| 22 | 28.8113 | 9.000 | 1.719950 | 50.23 |
| 23 | 233.9935 | 29.871 | | |
| 24 | −1052.9199 | 5.000 | 1.846660 | 23.78 |
| 25 | −31.3846 | 2.000 | 1.800999 | 34.96 |
| 26 | 57.3306 | 5.246 | | |
| 27 | 154.0318 | 2.000 | 1.834807 | 42.72 |
| 28 | 43.0260 | 8.000 | 1.497820 | 82.52 |
| 29 | −84.8918 | 0.100 | | |
| 30 | 41.1435 | 8.000 | 1.497820 | 82.52 |
| 31 | −345.8327 | 10.000 | | |
| 32 | −46.4776 | 2.000 | 1.799520 | 42.24 |
| 33 | −74.9722 | (Bf) | | |

[Variable Distances]

|  | W | M | T |
|---|---|---|---|
| (Focusing on Infinity) | | | |
| f | 71.400 | 135.000 | 196.000 |
| d7 | 2.000 | 25.737 | 34.011 |
| d14 | 31.317 | 16.341 | 2.009 |
| d19 | 21.434 | 12.673 | 18.732 |
| Bf | 53.445 | 53.445 | 53.445 |
| (Focusing on a Close Object) | | | |
| β | −0.040 | −0.070 | −0.090 |
| d0 | 1690.869 | 1675.412 | 1772.094 |
| d7 | 2.000 | 25.737 | 34.011 |
| d14 | 32.988 | 21.880 | 12.341 |
| d19 | 19.763 | 7.134 | 8.399 |
| Bf | 53.445 | 53.445 | 53.445 |

[Moving Amount for Focusing]

|  | W | M | T |
|---|---|---|---|
| f | 71.400 | 135.000 | 196.000 |
| δ3 | 1.671 | 5.538 | 10.332 |

[Lens Group Data]

| Group | I | focal length |
|---|---|---|
| G1 | 1 | 94.569 |
| G2 | 8 | −29.074 |
| G3 | 15 | 92.291 |
| G4 | 21 | 122.318 |
| G41 | 21 | 110.962 |
| G42 | 24 | −76.974 |
| G43 | 27 | 82.046 |

TABLE 5-continued

[Values for Conditional Expressions]

| (7): f1/f3 = | 1.03 |
|---|---|
| (8): f3/f4 = | 0.76 |

Figure 22A:
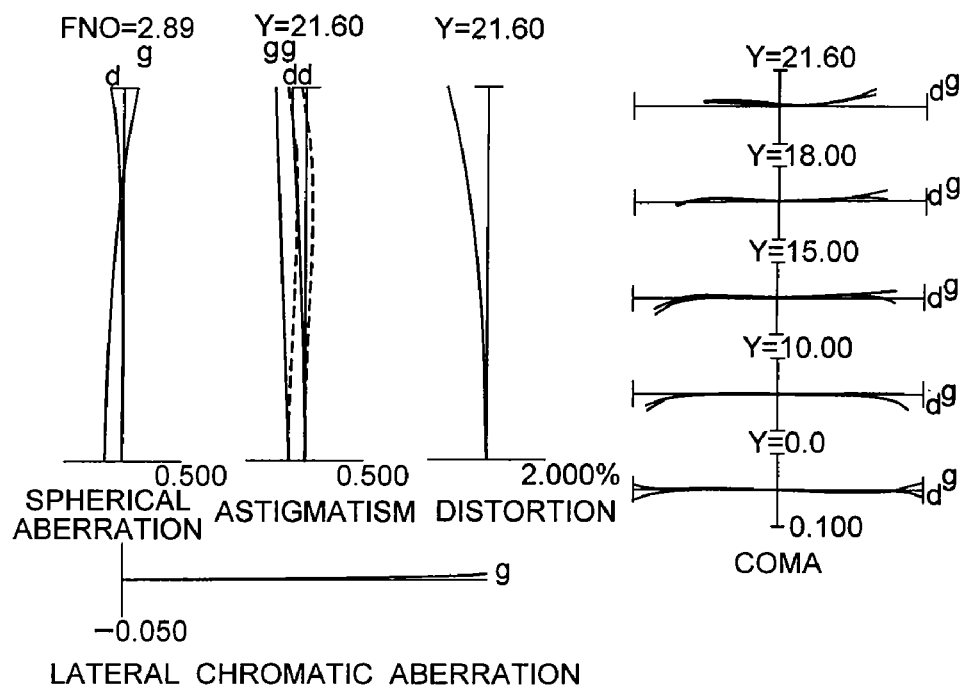
Figure 22B:
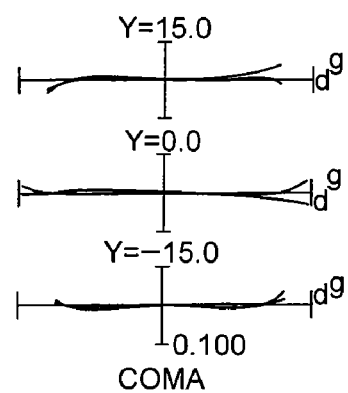
Figure 23:
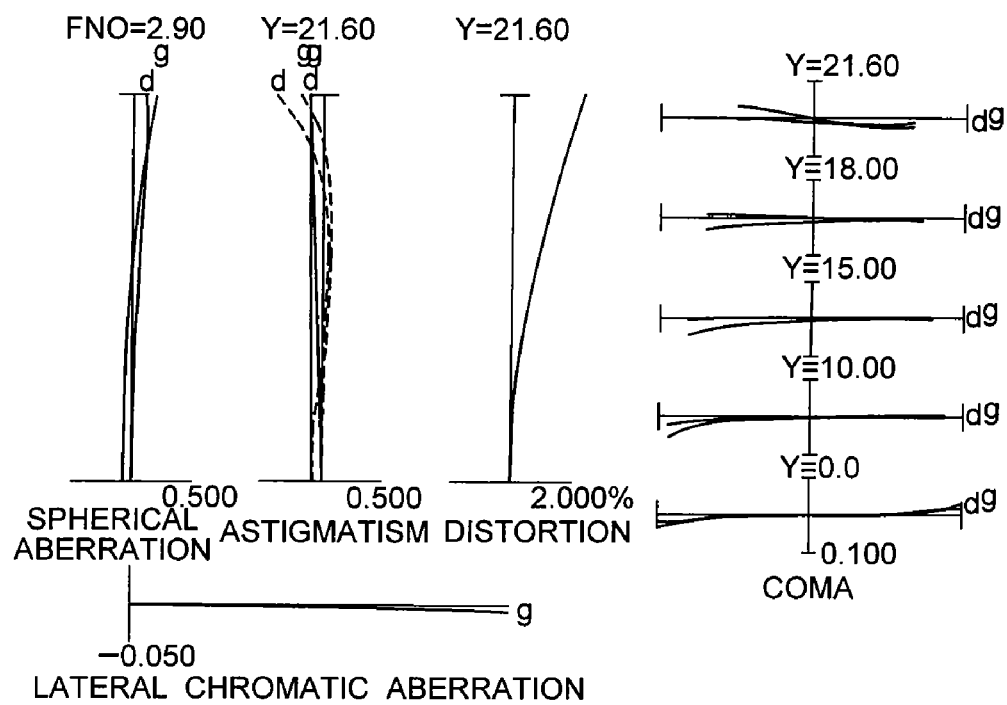
FIG. 23 shows various aberrations of the zoom lens system according to Example 5 in an intermediate focal length state upon focusing on infinity.
Figure 24A:
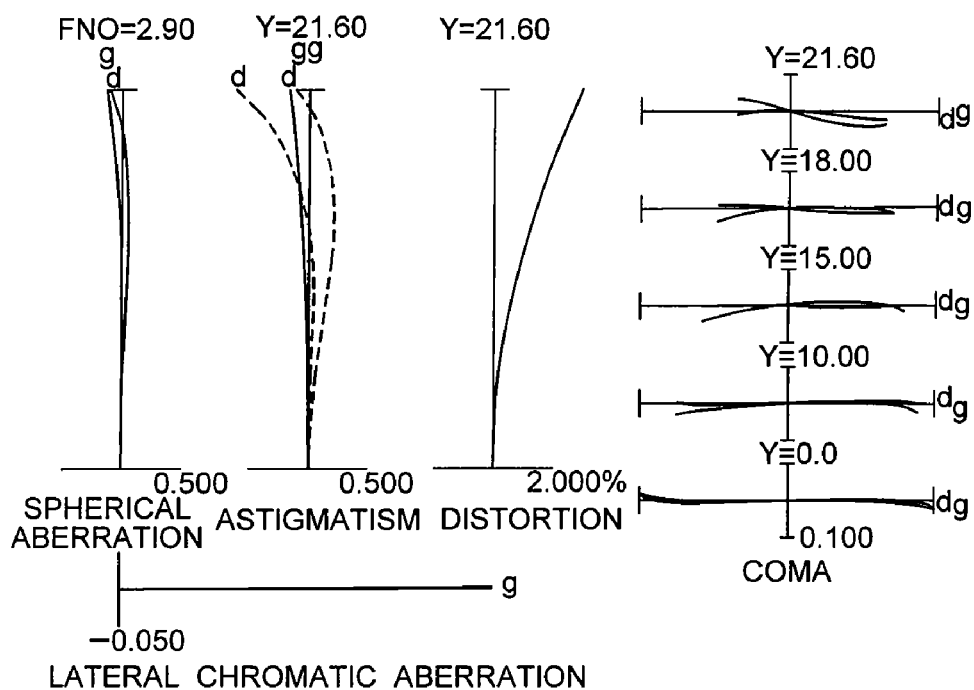
Figure 24B:
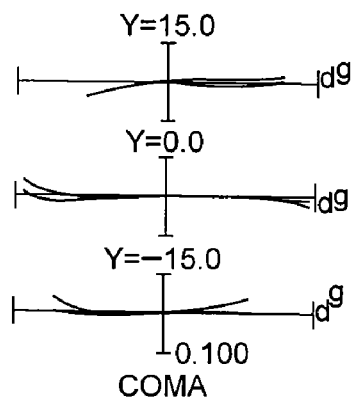
Figure 25A:
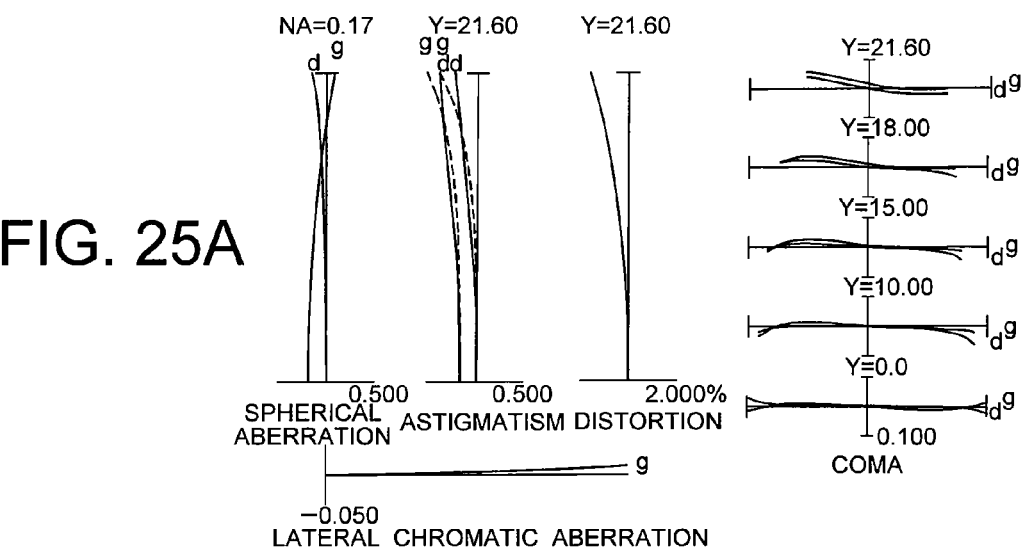
Figure 25B:
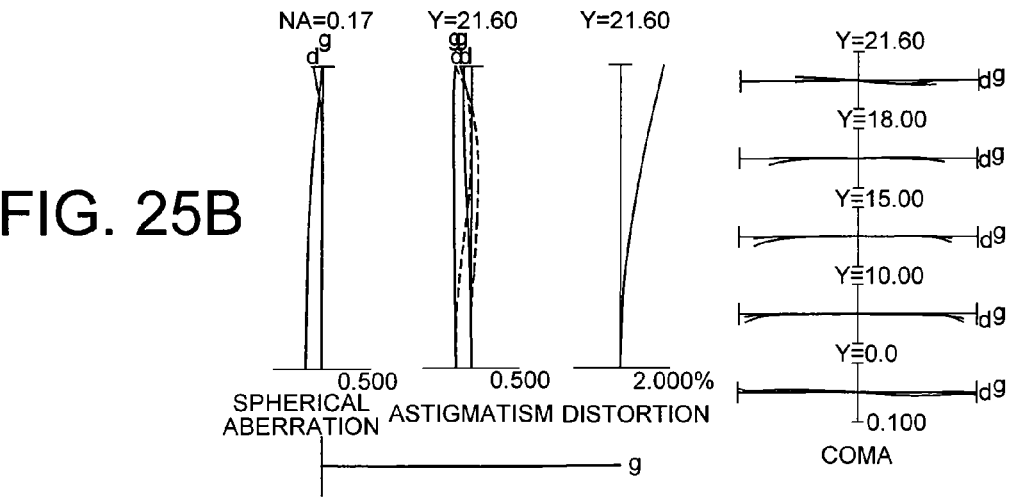
Figure 25C:
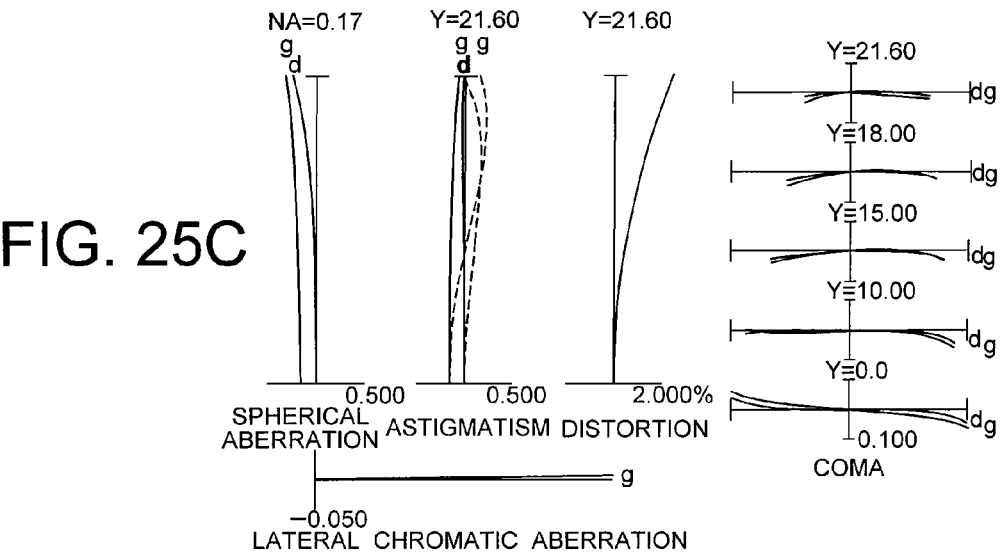

FIGS. 22A, and 22B are graphs showing various aberrations of the zoom lens system according to Example 5 in a wide-angle end state, in which FIG. 22A shows various aberrations upon focusing on infinity, FIG. 22B shows coma upon focusing on infinity upon correcting a rotational camera shake of 0.40 degrees. FIG. 23 shows various aberrations of the zoom lens system according to Example 5 in an intermediate focal length state upon focusing on infinity. FIGS. 24A, and 24B are graphs showing various aberrations of the zoom lens system according to Example 5 in a telephoto end state, in which FIG. 24A shows various aberrations upon focusing on infinity, and FIG. 24B shows coma upon focusing on infinity upon correcting a rotational camera shake of 0.20 degrees. FIGS. 25A, 25B and 25C are graphs showing various aberrations of the zoom lens system according to Example 5 upon focusing on a close object, in which FIG. 25A is in the wide-angle end state, FIG. 25B is in the intermediate focal length state, and FIG. 25C is in the telephoto end state.

As is apparent from the respective graphs, the zoom lens system having a vibration reduction function according to Example 5 of the second embodiment shows superb optical performance as a result of good corrections to various aberrations in the wide-angle end state, in the intermediate focal length state, and in the telephoto end state.

Example 6

FIG. 26 is a sectional view showing a lens configuration of a zoom lens system having a vibration reduction function according to Example 6 of the second embodiment. As shown in FIG. 26, the first lens group G1 is composed of, in order from the object, a cemented lens constructed by a negative meniscus lens L11 having a convex surface facing the object cemented with a positive meniscus lens L12 having a convex surface facing the object, a double convex positive lens L13, and a positive meniscus lens L14 having a convex surface facing the object. The second lens group G2 is composed of, in order from the object, a negative meniscus lens L21 having a convex surface facing the object, a cemented lens constructed by a double concave negative lens L22 cemented with a positive meniscus lens L23 having a convex surface facing the object, and a negative meniscus lens L24 having a concave surface facing the object. The third lens group G3 is composed of, in order from the object, a positive meniscus lens L31 having a concave surface facing the object, and a cemented lens constructed by a double convex positive lens L32 cemented with a negative meniscus lens L33 having a concave surface facing the object. The fourth lens group G4 is composed of, in order from the object, a front lens group G41 having positive refractive power, a middle lens group G42 having negative refractive power, and a rear lens group G43 having positive refractive power. The front lens group G41 is composed of a cemented lens constructed by, in order from the object, a negative meniscus lens L41 having a convex surface facing the object cemented with a positive meniscus lens L42 having a convex surface facing the object. The middle lens group G42 is composed of a cemented lens constructed by, in order from the object, a positive meniscus lens L43 having a concave surface facing the object cemented with a double concave negative lens L44. The rear lens group G43 is composed of, in order from the object, a cemented lens constructed by a negative meniscus lens L45 having a convex surface facing the object cemented with a double convex positive lens L46, a double convex positive lens L47, and a negative meniscus lens L48 having a concave surface facing the object. An aperture stop S is disposed to the most object side of the fourth lens group G4.

In the wide-angle end state (W) in Example 6 of the second embodiment, the vibration reduction coefficient K is 1.20, and the focal length is 71.40 (mm), so that the moving amount of the middle lens group G42 for correcting a rotational camera shake of 0.40 degrees is 0.42 (mm). In the telephoto end state (T), the vibration reduction coefficient K is 1.20, and the focal length is 196.00 (mm), so that the moving amount of the middle lens group G42 for correcting a rotational camera shake of 0.20 degrees is 0.57 (mm).

Various values associated with the zoom lens system having a vibration reduction function according to Example 6 of the second embodiment are listed in Table 6.

TABLE 6

[Specifications]
Zoom Ratio: 2.745

|  | W | M | T |
|---|---|---|---|
| f = | 71.40 | 135.00 | 196.00 |
| FNO = | 2.91 | 2.91 | 2.91 |
| 2ω = | 34.13 | 17.77 | 12.21 |
| Y = | 21.60 | 21.60 | 21.60 |
| TL = | 251.180 | 251.180 | 251.180 |
| Bf = | 48.517 | 48.517 | 48.517 |

[Lens Data]

| I | r | d | nd | νd |
|---|---|---|---|---|
| 1 | 227.5832 | 2.000 | 1.850260 | 32.35 |
| 2 | 84.5495 | 10.000 | 1.497820 | 82.52 |
| 3 | 3639.4392 | 0.100 | | |
| 4 | 103.9494 | 8.000 | 1.497820 | 82.52 |
| 5 | −7215.7012 | 0.100 | | |
| 6 | 81.2067 | 8.000 | 1.603001 | 65.46 |
| 7 | 754.5704 | (d7) | | |
| 8 | 263.9907 | 2.200 | 1.834807 | 42.72 |
| 9 | 33.5991 | 7.937 | | |
| 10 | −75.6559 | 2.000 | 1.487490 | 70.41 |
| 11 | 40.2193 | 6.000 | 1.846660 | 23.78 |
| 12 | 441.9323 | 4.468 | | |
| 13 | −46.1911 | 2.200 | 1.618000 | 63.37 |
| 14 | −442.6275 | (d14) | | |
| 15 | −1661.3596 | 4.500 | 1.834807 | 42.72 |
| 16 | −91.5486 | 0.100 | | |
| 17 | 128.6280 | 7.500 | 1.497820 | 82.52 |
| 18 | −60.0631 | 2.000 | 1.850260 | 32.35 |
| 19 | −163.2706 | (d19) | | |
| 20 | ∞ | 1.000 | Aperture Stop S | |
| 21 | 45.0978 | 2.000 | 1.846660 | 23.78 |
| 22 | 29.5011 | 10.000 | 1.617720 | 49.78 |
| 23 | 1494.5462 | 25.000 | | |
| 24 | −174.6589 | 5.000 | 1.846660 | 23.78 |
| 25 | −29.3273 | 2.000 | 1.749500 | 35.04 |
| 26 | 50.5294 | 5.000 | | |
| 27 | 104.6269 | 2.000 | 1.816000 | 46.62 |
| 28 | 37.1401 | 8.000 | 1.497820 | 82.52 |
| 29 | −84.5560 | 3.777 | | |
| 30 | 40.8781 | 8.000 | 1.487490 | 70.41 |
| 31 | −282.5154 | 10.000 | | |
| 32 | −55.4388 | 2.000 | 1.816000 | 46.62 |
| 33 | −112.8659 | (Bf) | | |

TABLE 6-continued

[Variable Distances]

| | W | M | T |
|---|---|---|---|
| (Focusing on Infinity) | | | |
| f | 71.400 | 135.000 | 196.000 |
| d7 | 2.000 | 25.227 | 33.371 |
| d14 | 27.831 | 14.666 | 2.000 |
| d19 | 21.949 | 11.888 | 16.409 |
| Bf | 48.517 | 48.517 | 48.517 |
| (Focusing on a Close Object) | | | |
| β | −0.040 | −0.070 | −0.090 |
| d0 | 1690.869 | 1675.412 | 1772.094 |
| d7 | 2.000 | 25.227 | 33.371 |
| d14 | 27.831 | 14.666 | 2.000 |
| d19 | 21.949 | 11.888 | 16.409 |
| Bf | 48.517 | 48.517 | 48.517 |

[Moving Amount for Focusing]

| | W | M | T |
|---|---|---|---|
| f | 71.400 | 135.000 | 196.000 |
| δ3 | 1.439 | 4.748 | 8.868 |

[Lens Group Data]

| Group | I | focal length |
|---|---|---|
| G1 | 1 | 92.505 |
| G2 | 8 | −27.046 |
| G3 | 15 | 84.455 |
| G4 | 21 | 116.619 |
| G41 | 21 | 92.636 |
| G42 | 24 | −60.445 |
| G43 | 27 | 76.890 |

[Values for Conditional Expressions]

| (7): f1/f3 = | 1.10 |
|---|---|
| (8): f3/f4 = | 0.72 |

Figure 27A:
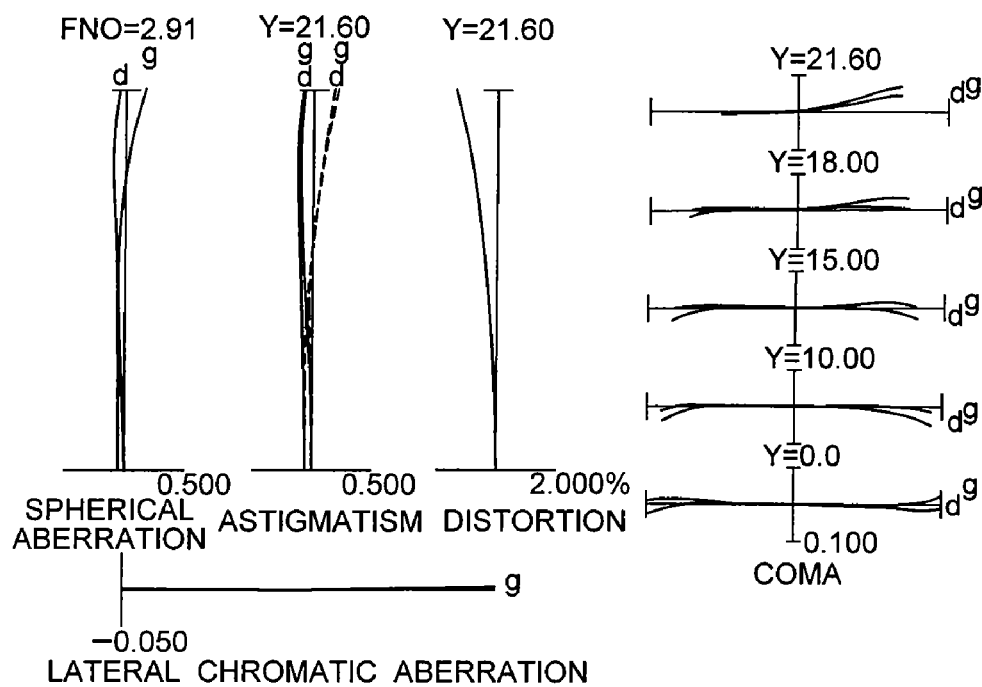
Figure 27B:
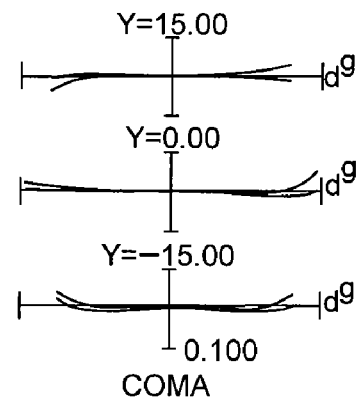
Figure 28:
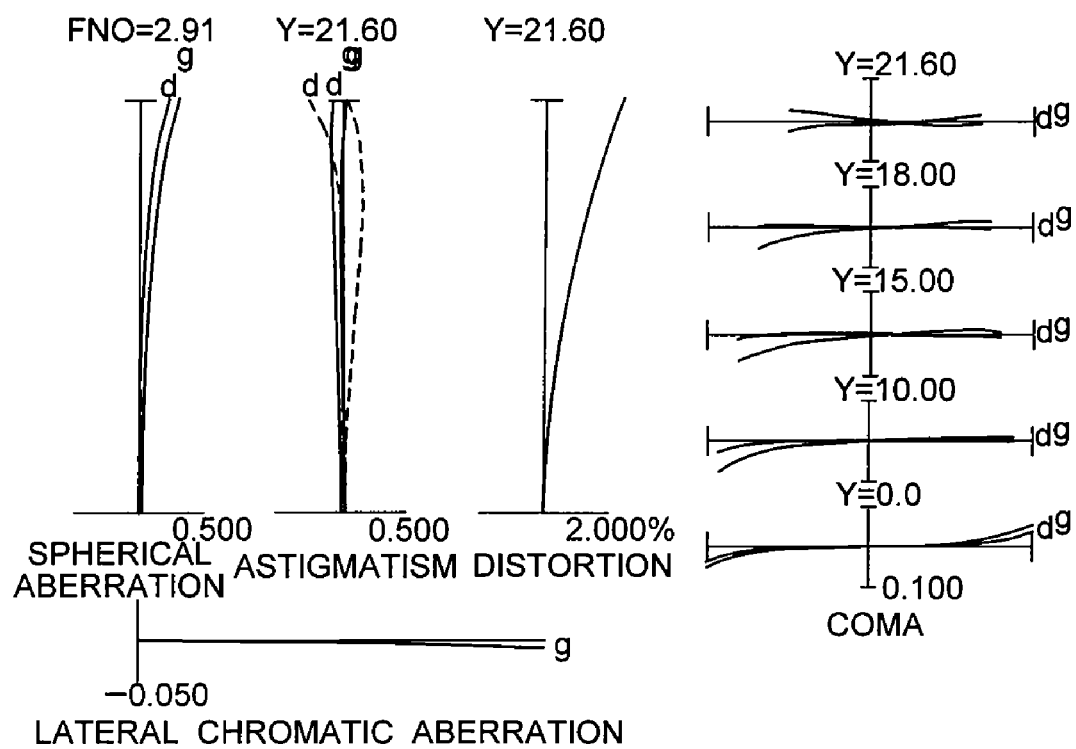
FIG. 28 shows various aberrations of the zoom lens system according to Example 6 in an intermediate focal length state upon focusing on infinity.
Figure 29A:
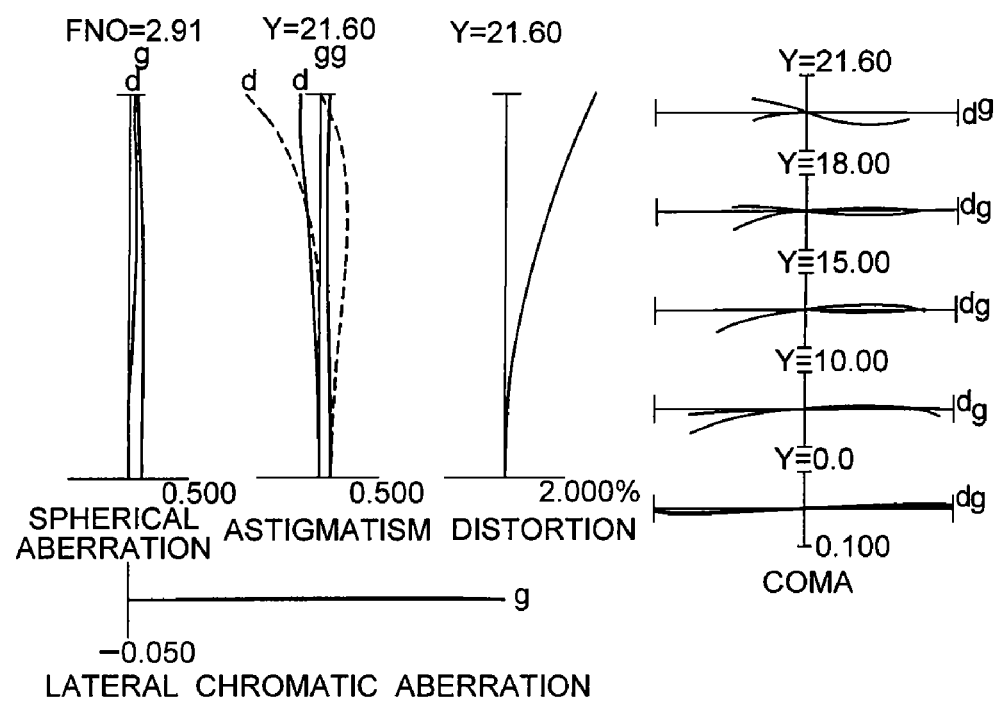
Figure 29B:
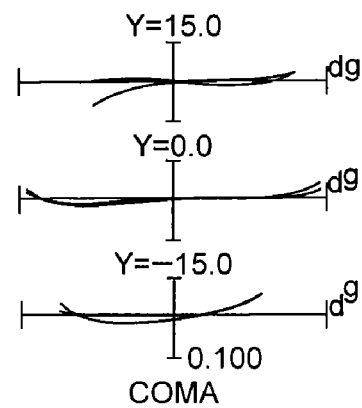
Figure 30A:
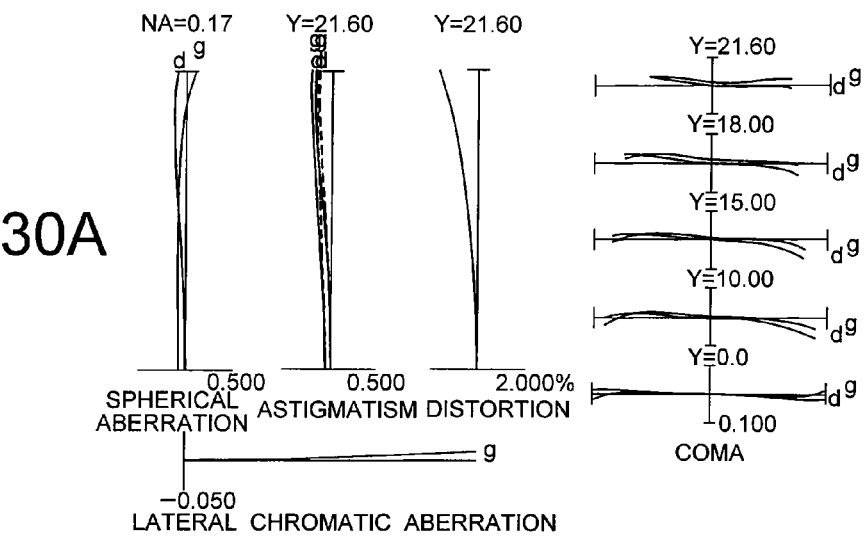
Figure 30B:
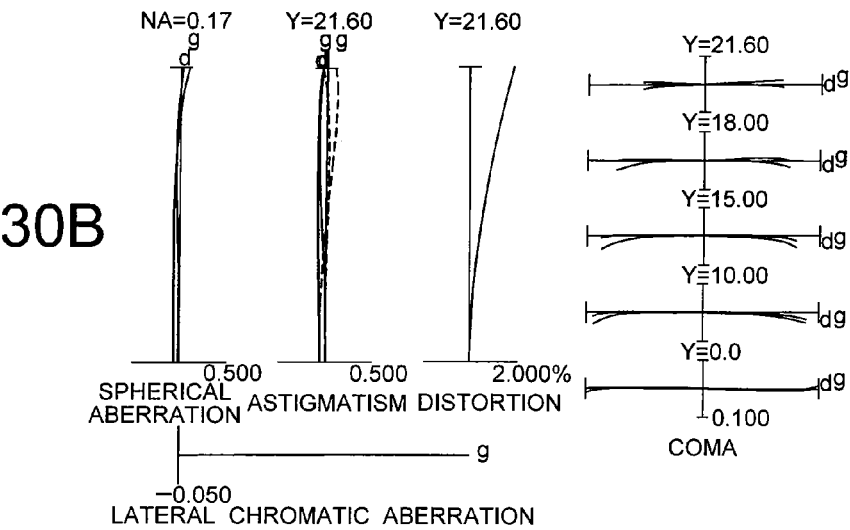
Figure 30C:
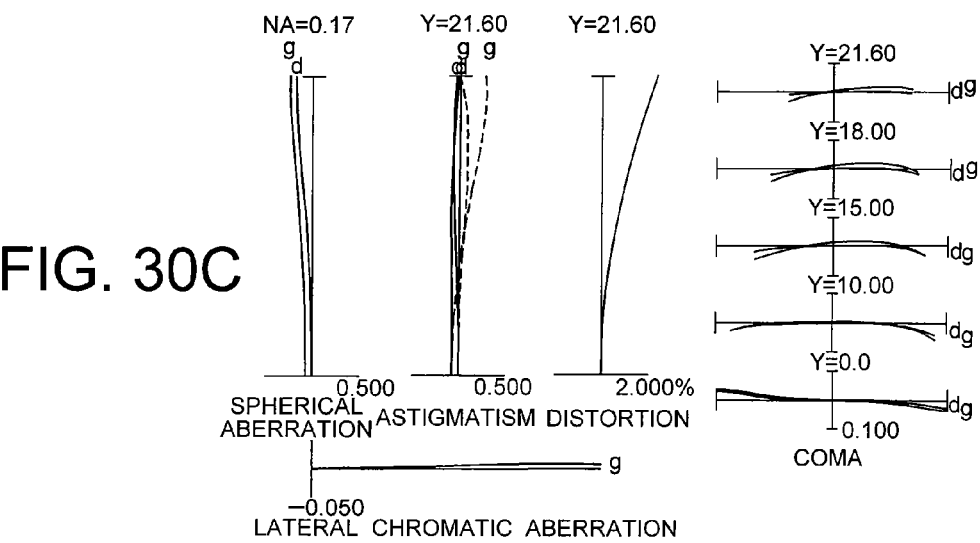

FIGS. 27A, and 27B are graphs showing various aberrations of the zoom lens system according to Example 6 in a wide-angle end state, in which FIG. 27A shows various aberrations upon focusing on infinity, FIG. 27B shows coma upon focusing on infinity upon correcting a rotational camera shake of 0.40 degrees. FIG. 28 shows various aberrations of the zoom lens system according to Example 6 in an intermediate focal length state upon focusing on infinity. FIGS. 29A, and 29B are graphs showing various aberrations of the zoom lens system according to Example 6 in a telephoto end state, in which FIG. 29A shows various aberrations upon focusing on infinity, and FIG. 29B shows coma upon focusing on infinity upon correcting a rotational camera shake of 0.20 degrees. FIGS. 30A, 30B and 30C are graphs showing various aberrations of the zoom lens system according to Example 6 upon focusing on a close object, in which FIG. 30A is in the wide-angle end state, FIG. 30B is in the intermediate focal length state, and FIG. 30C is in the telephoto end state.

As is apparent from the respective graphs, the zoom lens system having a vibration reduction function according to Example 6 of the second embodiment shows superb optical performance as a result of good corrections to various aberrations in the wide-angle end state, in the intermediate focal length state, and in the telephoto end state.

Then, an imaging apparatus (a single-lens reflex camera) equipped with a zoom lens system with a vibration reduction function according to Example 1 of the first embodiment is explained below.

Figure 31:
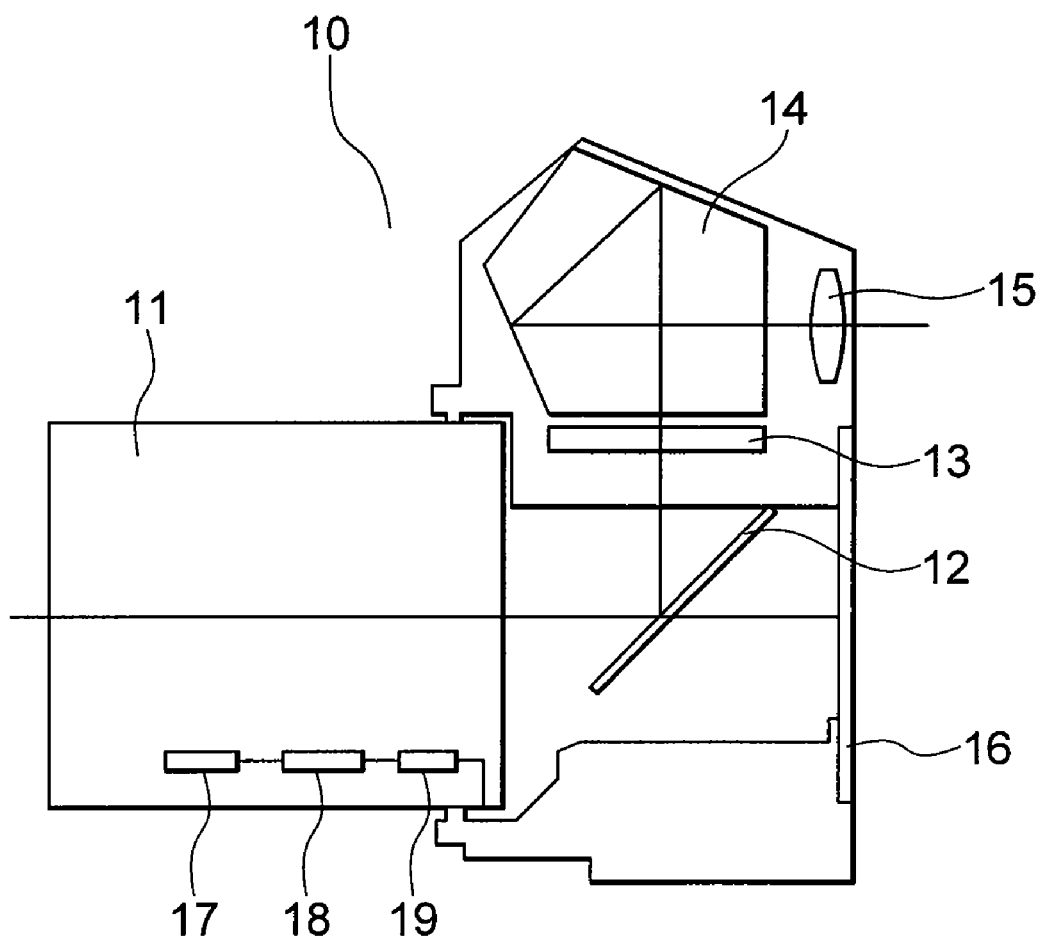
FIG. 31 is a graph showing an optical apparatus equipped with a zoom lens system having a vibration reduction function according to Example 1 of the first embodiment.

FIG. 31 is a schematic diagram showing an imaging apparatus (a single-lens reflex camera) using the zoom lens system with a vibration reduction function according to Example 1 of the first embodiment.

In FIG. 31, light coming out from an object (not shown) is converged by a zoom lens system 11 with a vibration reduction function, reflected by a quick return mirror 12, and focused on a focusing screen 13. The object image focused on the focusing screen 13 is reflected a plurality of times by a pentagonal roof prism 14, and observed by a photographer as an erected image through an eyepiece 15.

After fixing a picture composition with observing the object image through the eyepiece 15 by half-pressing a release button (not shown), the photographer presses the release button all the way down. Upon pressing the release button all the way down, the quick return mirror 12 is flipped up, the light from the object is detected by an imaging device 16, and a photographed image is captured and stored in a memory (not shown).

When the release button is pressed all the way down, a tilt of the camera 10 is detected by a sensor 17 such as an angular sensor stored in the zoom lens 11, and transmitted to a CPU 18. Then, an amount of a rotational camera shake is detected by the CPU 18, a lens driver 19 for driving a vibration reductioN-th lens group in a direction perpendicular to the optical axis is driven, and an image blur on the imaging device 16 upon generating a camera shake is corrected. In this manner, the imaging apparatus 10 using the zoom lens system 11 with a vibration reduction function is constructed.

Figure 32:
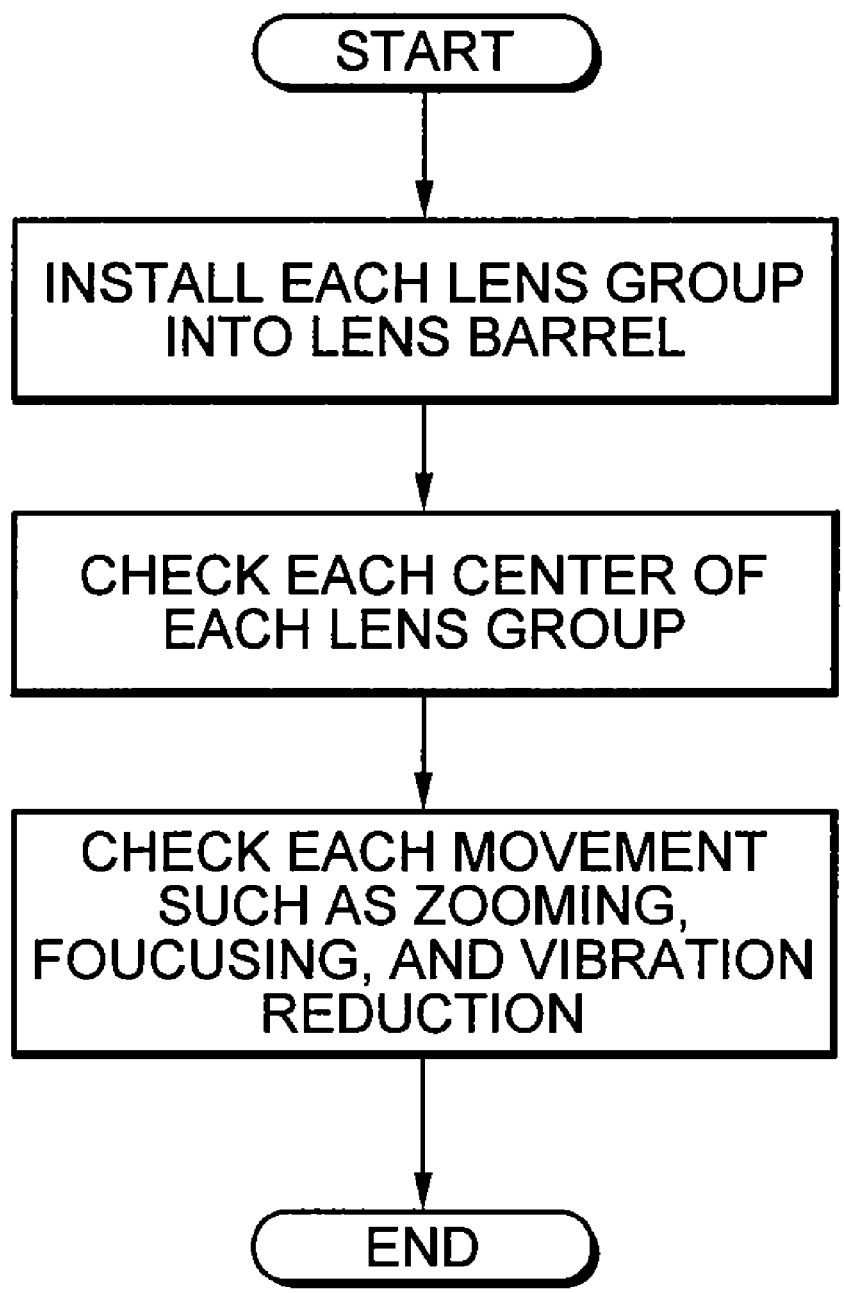
FIG. 32 is a block diagram showing an outline of a method for manufacturing a zoom lens system according to any of the present embodiments.

Then, an outline of a method for manufacturing a zoom lens system is explained with reference to FIG. 32.

At first, each lens group is installed in a lens barrel having a cylindrical shape. Upon installing each lens barrel, each lens barrel may be installed one by one in order from an object or an image along an optical axis. Otherwise, after putting a portion of lens groups or all lens groups into respective holding members in a body, and the holding members may be installed in the lens barrel. After installing the lens holding members into the lens barrel, it is preferably checked whether the center of each lens group is coincides with each other or not.

After assembling a zoom lens system, each movement of the zoom lens system should be checked. As an example of such movements, there is a zooming movement that at least a part of lens groups is moved along the optical axis upon zooming, a focusing movement that at least a portion of a lens group is moved along the optical axis upon focusing from an infinity object to a close object, or a vibration reduction movement that at least a portion of a lens group is moved in a direction perpendicular to the optical axis upon correcting an image blur caused by a camera shake. The order of each confirmation may be chosen freely.

As described above, each embodiment makes it possible to provide a large aperture zoom lens system having a vibration reduction function with a zoom ratio of about three, an angle of view of 34 degrees or more in the wide-angle end state, a camera equipped with the zoom lens system, and a method for manufacturing the zoom lens system.

Incidentally, the following description may suitably be applied within limits that do not deteriorate optical performance.

Although a zoom lens system with a four-lens-group configuration is shown as each Example of each embodiment, the lens-group configuration according to the present embodiment is not limited to this, other lens-group configurations such as a five-lens-group configuration, and a six-lens-group configuration are possible. In the present embodiment for example, although the zoom lens system is composed of four movable lens groups, another lens group may be added between adjacent lens groups, or a lens group may be added closely to the object side or the image side of the system. Moreover, the fourth lens group of the zoom lens system may be composed of a front lens group G41 and a middle lens group G42, and a rear lens group G43 may be acted as a fifth lens group moving along the optical axis upon zooming.

In each Example, a case where the third lens group G3 is moved upon focusing from an infinity object to a close object is explained. In order to carry out focusing from an infinity object to a close object, not only the third lens group G3 but a portion of a lens group, a single lens group, or a plurality of lens groups may be moved along the optical axis. In this case, the focusing lens group(s) may be used for auto focus, and suitable for being driven by a motor such as an ultrasonic motor. In a zoom lens system having a vibration reduction function according to the present embodiment, it is preferable that the third lens group is used for the focusing lens group. In addition, the first lens group G1, or second lens group G2 may be the focusing lens group.

A lens group or a portion of a lens group may be sifted in a direction perpendicular to the optical axis as a vibration reductioN-th lens group for correcting an image blur caused by a camera shake. In each embodiment, it is particularly preferable that the middle lens group G42 of the fourth lens group G4 is used as a vibration reductioN-th lens group.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface. On the other hand, all lens surfaces composing the zoom lens system may be made by combination of spherical surfaces and plane surfaces. The zoom lens system having a vibration reduction function according to the present embodiment may be configured without using an aspherical surface, so that it is preferable in view of manufacturing tolerance.

Although an aperture stop is preferably disposed in the vicinity of the fourth lens group, the function may be substituted by a lens frame without disposing a member as an aperture stop. The position of the aperture stop S may be in front, inside, or rear of the fourth lens group. Moreover, the aperture stop S may be disposed to the object side of the fourth lens group G4 and fixed upon zooming.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices.

What is claimed is:

1. A zoom lens system comprising, in order from an object:
a first lens group having positive refractive power;
a second lens group;
a third lens group; and
an N-th lens group disposed nearer to an image than the third lens group, and including, in order from the object, a front lens group having positive refractive power, a middle lens group having negative refractive power, and a rear lens group, and the middle lens group being movable in the direction perpendicular to the optical axis;

upon zooming from a wide-angle end state to a telephoto end state, a distance between the first lens group and the second lens group varying, and a distance between the second lens group and the third lens group varying, upon focusing from an infinity object to a close object, the third lens group moving, and wherein the following conditional expression is satisfied:

$$1.39 < f1/fw \leq 1.838$$

where f1 denotes a focal length of the first lens group, and fw denotes a focal length of the zoom lens system in the wide-angle end state.

2. The zoom lens system according to claim 1, wherein the second lens group has negative refractive power, the third lens group has positive refractive power, and the N-th lens group has positive refractive power.

3. The zoom lens system according to claim 1, wherein upon zooming from the wide-angle end state to the telephoto end state, the distance between the first lens group and the second lens group increases, and the distance between the second lens group and the third lens group decreases.

4. The zoom lens system according to claim 1, wherein upon zooming from the wide-angle end state to the telephoto end state, the first lens group is fixed.

5. The zoom lens system according to claim 1, wherein upon zooming from the wide-angle end state to the telephoto end state, the N-th lens group is fixed.

6. The zoom lens system according to claim 1, wherein the following conditional expression is satisfied:

$$-0.90 < f2/fw < -0.50$$

where f2 denotes a focal length of the second lens group, and fw denotes a focal length of the zoom lens system in the wide-angle end state.

7. The zoom lens system according to claim 1, wherein the following conditional expression is satisfied:

$$1.60 < fN/fw < 2.00$$

where fN denotes a focal length of the N-th lens group, and fw denotes a focal length of the zoom lens system in the wide-angle end state.

8. The zoom lens system according to claim 1, wherein the following conditional expression is satisfied:

$$-0.40 < fN2/fN < -0.10$$

where fN denotes a focal length of the N-th lens group, and fN2 denotes a focal length of the middle lens group in the N-th lens group.

9. The zoom lens system according to claim 1, wherein the following conditional expressions are satisfied:

$$0.20 < fN1/fN < 0.80$$

$$0.20 < fN3/fN < 0.50$$

where fN1 denotes a focal length of the front lens group in the N-th lens group, fN3 denotes a focal length of the rear lens group in the N-th lens group, and fN denotes a focal length of the N-th lens group.

10. The zoom lens system according to claim 1, further comprising an aperture stop, wherein the aperture stop is disposed nearer to an image than the third lens group.

11. The zoom lens system according to claim 1, wherein the N-th lens group includes, in order from the object, a front lens group having positive refractive power, and a middle lens group having negative refractive power, the front lens group includes a negative meniscus lens having a convex surface facing the object, and vibration reduction is carried out by moving the middle lens group in the direction perpendicular to the optical axis.

12. The zoom lens system according to claim 1, wherein the following conditional expression is satisfied:

$$0.8 < f1/f3 < 1.3$$

where f1 denotes a focal length of the first lens group, and f3 denotes a focal length of the third lens group.

13. The zoom lens system according to claim 1, wherein the following conditional expression is satisfied:

$$0.5 < f3/fN < 1.2$$

where f3 denotes a focal length of the third lens group, and fN denotes a focal length of the N-th lens group.

14. The zoom lens system according to claim 11, wherein the middle lens group is composed of a cemented lens.

15. A zoom lens system comprising, in order from an object:
   a first lens group having positive refractive power;
   a second lens group;
   a third lens group; and
   an N-th lens group disposed nearer to an image than the third lens group and including, in order from the object, a front lens group having positive refractive power, a middle lens group having negative refractive power, and a rear lens group, and the middle lens group being movable in a direction perpendicular to the optical axis;
   upon zooming from a wide-angle end state to a telephoto end state, the first lens group and the N-th lens group being fixed;
   the third lens group being movable for focusing from an infinity object to a close object, and
   wherein the following conditional expression is satisfied:

$$1.39 < f1/fw \leq 1.838$$

where f1 denotes a focal length of the first lens group, and fw denotes a focal length of the zoom lens system in the wide-angle end state.

16. The zoom lens system according to claim 15, wherein the second lens group has negative refractive power, the third lens group has positive refractive power, and the N-th lens group has positive refractive power.

17. The zoom lens system according to claim 15, wherein upon zooming from the wide-angle end state to the telephoto end state, a distance between the first lens group and the second lens group increases, and a distance between the second lens group and the third lens group decreases.

18. A zoom lens system comprising, in order from an object:
   a first lens group having positive refractive power;
   a second lens group;
   a third lens group; and
   an N-th lens group disposed nearer to an image than the third lens group and including, in order from the object, a front lens group having positive refractive power, a middle lens group having negative refractive power, and a rear lens group, and the middle lens group being movable in a direction perpendicular to the optical axis;
   upon zooming from a wide-angle end state to a telephoto end state, the first lens group and the N-th lens group being fixed;
   upon focusing from an infinity object to a close object, the third lens group moving;
   only one cemented lens in the N-th lens group being movable in a direction perpendicular to an optical axis of the zoom lens system, and wherein the following conditional expression is satisfied:

$$1.39 < f1/fw \leq 1.838$$

where f1 denotes a focal length of the first lens group, and fw denotes a focal length of the zoom lens system in the wide-angle end state.

19. The zoom lens system according to claim 18, wherein the second lens group has negative refractive power, the third lens group has positive refractive power, and the N-th lens group has positive refractive power.

20. An optical apparatus equipped with the zoom lens system according to claim 1.

21. A method for manufacturing a zoom lens system comprising steps of:
   disposing, in order from an object, a first lens group having positive refractive power, a second lens group, and a third lens group;
   disposing an N-th lens group nearer to an image than the third lens group and including, in order from the object, a front lens group having positive refractive power, a middle lens group having negative refractive power, and a rear lens group, and the middle lens group being movable in a direction perpendicular to the optical axis; and
   constructing the zoom lens system such that:
   a distance between the first lens group and the second lens group, and a distance between the second lens group and the third lens group, are varied upon zooming from a wide-angle end state to a telephoto end state;
   the third lens group is moved along an optical axis of the zoom lens system upon focusing from an infinity object to a close object; and
   the middle lens group of the N-th lens group is moved in a direction perpendicular to the optical axis upon vibration reduction, and
   wherein the following conditional expression is satisfied:

$$1.39 < f1/fw \leq 1.838$$

where f1 denotes a focal length of the first lens group, and fw denotes a focal length of the zoom lens system in the wide-angle end state.

22. The method according to claim 21, wherein the second lens group has negative refractive power, the third lens group has positive refractive power, and the N-th lens group has positive refractive power.

23. The method according to claim 21, further comprising constructing the zoom lens system such that:
   the distance between the first lens group and the second lens group is increased upon zooming from the wide-angle end state to the telephoto end state; and
   the distance between the second lens group and the third lens group is decreased upon zooming from the wide-angle end state to the telephoto end state.

24. The method according to claim 21, further comprising constructing the zoom lens system such that:
   the first lens group is fixed upon zooming from the wide-angle end state to the telephoto end state.

25. The method according to claim 21, further comprising constructing the zoom lens system such that:
   the N-th lens group is fixed upon zooming from the wide-angle end state to the telephoto end state.

26. The method according to claim 21, further comprising a step of:
   satisfying the following conditional expression:

$$-0.90 < f2/fw < -0.50$$

where f2 denotes a focal length of the second lens group, and fw denotes a focal length of the zoom lens system in the wide-angle end state.

27. The method according to claim 21, further comprising a step of:
satisfying the following conditional expression:

$$1.39 < f1/fw < 2.00$$

where f1 denotes a focal length of the first lens group, and fw denotes a focal length of the zoom lens system in the wide-angle end state.

28. The method according to claim 21, further comprising a step of:
satisfying the following conditional expression:

$$1.60 < fN/fw < 2.00$$

where fN denotes a focal length of the N-th lens group, and fw denotes a focal length of the zoom lens system in the wide-angle end state.

29. The method according to claim 21, further comprising a step of:
satisfying the following conditional expression:

$$-0.40 < fN2/fN < -0.10$$

where fN denotes a focal length of the N-th lens group, and fN2 denotes a focal length of the middle lens group in the N-th lens group.

30. The method according to claim 21, further comprising a step of:
satisfying the following conditional expressions:

$$0.20 < fN1/fN < 0.80$$

$$0.20 < fN3/fN < 0.50$$

where fN denotes a focal length of the N-th lens group, fN1 denotes a focal length of the front lens group in the N-th lens group, and fN3 denotes a focal length of the rear lens group in the N-th lens group.

31. The method according to claim 21, further comprising a step of:
disposing an aperture stop nearer to the image than the third lens group.

32. The method according to claim 21, further comprising steps of:
including in the N-th lens group, in order from the object, a front lens group having positive refractive power and including a negative meniscus lens having a convex surface facing the object, a middle lens group having negative refractive power; and
constructing the zoom lens system such that the middle lens group is moved in a direction perpendicular to the optical axis upon vibration reduction.

33. The method according to claim 21, further comprising a step of:
satisfying the following conditional expression:

$$0.8 < f1/f3 < 1.3$$

where f1 denotes a focal length of the first lens group, and f3 denotes a focal length of the third lens group.

34. The method according to claim 21, further comprising a step of:
satisfying the following conditional expression:

$$0.5 < f3/fN < 1.2$$

where f3 denotes a focal length of the third lens group, and fN denotes a focal length of the N-th lens group.

35. The method according to claim 21, wherein the middle lens group is composed of a cemented lens.

36. A method for manufacturing a zoom lens system comprising steps of:
disposing, in order from an object, a first lens group having positive refractive power, a second lens group, and a third lens group;
disposing an N-th lens group to an image side of the third lens group and including, in order from the object, a front lens group having positive refractive power, a middle lens group having negative refractive power, and a rear lens group, and the middle lens group being movable in a direction perpendicular to the optical axis; and
constructing the zoom lens system such that:
positions of the first lens group and the N-th lens group are fixed upon zooming from a wide-angle end state to a telephoto end state;
the third lens group is moved along an optical axis of the zoom lens system upon focusing from an infinity object to a close object; and
the middle lens group of the N-th lens group is movable in a direction perpendicular to the optical axis upon vibration reduction, and
wherein the following conditional expression is satisfied:

$$1.39 < f1/fw \leq 1.838$$

where f1 denotes a focal length of the first lens group, and fw denotes a focal length of the zoom lens system in the wide-angle end state.

37. The method according to claim 36, wherein the second lens group has negative refractive power, the third lens group has positive refractive power, and the N-th lens group has positive refractive power.

38. The method according to claim 36, further comprising constructing the zoom lens system such that:
a distance between the first lens group and the second lens group is increased upon zooming from the wide-angle end state to the telephoto end state; and
a distance between the second lens group and the third lens group is decreased upon zooming from the wide-angle end state to the telephoto end state.

39. A method for manufacturing a zoom lens system comprising steps of:
disposing, in order from an object, a first lens group having positive refractive power, a second lens group, and a third lens group;
disposing an N-th lens group nearer to an image than the third lens group, and including, in order from the object, a front lens group having positive refractive power, a middle lens group having negative refractive power, and a rear lens group, and the middle lens group being movable in a direction perpendicular to the optical axis; and
constructing the zoom lens system such that the third lens group is moved upon focusing from an infinity object to a close object;
positions of the first lens group and the N-th lens group along an optical axis of the zoom lens system are fixed upon zooming from a wide-angle end state to a telephoto end state; and
only one cemented lens in the N-th lens group is moved in a direction perpendicular to the optical axis upon vibration reduction, and
wherein the following conditional expression is satisfied:

$$1.39 < f1/fw \leq 1.838$$

where f1 denotes a focal length of the first lens group, and fw denotes a focal length of the zoom lens system in the wide-angle end state.

40. The method according to claim 39, wherein the second lens group has negative refractive power, the third lens group has positive refractive power, and the N-th lens group has positive refractive power.

41. An optical apparatus equipped with the zoom lens system according to claim 15.

42. An optical apparatus equipped with the zoom lens system according to claim 18.

43. A zoom lens system according to claim 1, wherein upon focusing from an infinity object to a close object, the third lens group is moved toward the image.

44. A zoom lens system according to claim 15, wherein upon focusing from an infinity object to a close object, the third lens group is moved toward the image.

45. A zoom lens system according to claim 18, wherein upon focusing from an infinity object to a close object, the third lens group is moved toward the image.

46. A method according to claim 21, wherein the zoom lens system is constructed such that the third lens group is moved along the optical axis of the zoom lens system toward the image upon focusing from an infinity object to a close object.

47. A method according to claim 36, wherein the zoom lens system is constructed such that the third lens group is moved along the optical axis of the zoom lens system toward the image upon focusing from an infinity object to a close object.

48. A method according to claim 39, wherein the zoom lens system is constructed such that the third lens group is moved along the optical axis of the zoom lens system toward the image upon focusing from an infinity object to a close object.

* * * * *